(12) United States Patent
Ruotsalainen et al.

(10) Patent No.: US 11,409,030 B2
(45) Date of Patent: Aug. 9, 2022

(54) OPTICAL ARRANGEMENT FOR PROVIDING PRIVACY

(71) Applicant: Teknologian tutkimuskeskus VTT Oy, Espoo (FI)

(72) Inventors: Teemu Ruotsalainen, Vtt (FI); Asko Sneck, Vtt (FI); Tapio Mäkelä, Vtt (FI)

(73) Assignee: Teknologian Tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 17/511,028

(22) Filed: Oct. 26, 2021

(65) Prior Publication Data

US 2022/0128757 A1    Apr. 28, 2022

(30) Foreign Application Priority Data

Oct. 26, 2020   (FI) ...................................... 20206055

(51) Int. Cl.
*F21V 8/00*  (2006.01)
*G02F 1/137*  (2006.01)

(52) U.S. Cl.
CPC ......... *G02B 6/0036* (2013.01); *G02B 6/0023* (2013.01); *G02F 1/13756* (2021.01)

(58) Field of Classification Search
CPC .. G02B 6/0036; G02B 6/0023; G02F 1/13756
See application file for complete search history.

(56) References Cited

U.S. PATENT DOCUMENTS

| | | | |
|---|---|---|---|
| 6,729,736 B2 | 5/2004 | Umemoto | |
| 2004/0130884 A1 | 7/2004 | Yoo et al. | |
| 2007/0008456 A1 | 1/2007 | Lesage et al. | |
| 2008/0285306 A1 | 11/2008 | Sugihara et al. | |
| 2019/0004236 A1 | 1/2019 | Saitoh et al. | |
| 2019/0018186 A1* | 1/2019 | Fattal | G02F 1/1336 |
| 2020/0012129 A1 | 1/2020 | Wu | |

(Continued)

FOREIGN PATENT DOCUMENTS

| | | |
|---|---|---|
| CN | 107195248 B | 11/2019 |
| JP | H0728061 U | 5/1995 |
| JP | 2011228089 A | 11/2011 |

(Continued)

OTHER PUBLICATIONS

International Search Report, Application No. PCT/FI2021/050710, dated Feb. 11, 2022, 4 pages.

(Continued)

*Primary Examiner* — Donald L Raleigh
(74) *Attorney, Agent, or Firm* — Ziegler IP Law Group, LLC

(57) ABSTRACT

A masking device disposed over a display has a first viewing region, a second viewing region, a first operating mode, and a second operating mode, wherein in the first operating mode the masking device allows a first observer located in the first viewing region to observe information displayed on the display, and also allows a second observer located in the second viewing region to observe the displayed information, wherein in the second operating mode the masking device projects light to the second viewing region so as to prevent the second observer from observing the displayed information.

14 Claims, 22 Drawing Sheets

(56) References Cited

U.S. PATENT DOCUMENTS

2020/0292746 A1\* 9/2020 Heber ................ G02B 6/0076

FOREIGN PATENT DOCUMENTS

| JP | 2014107167 A | 6/2014 |
|---|---|---|
| JP | 2014146551 A | 8/2014 |
| WO | 2017002788 A1 | 1/2017 |
| WO | 2019090139 A1 | 5/2019 |
| WO | 2019102959 A1 | 5/2019 |

OTHER PUBLICATIONS

Written Opinion of the International Searching Authority, Application No. PCT/FI2021/050710, dated Feb. 11, 2011, 8 pages.
Liu et al., "Roll-to-roll UV embossing process applied for light bar-based sub wavelength gratings for backlight", 2013 Society for Information Display, pp. 646-652, DOI: 10.1002/jsid.131, 7 pages.
Finnish Patent and Registration Office, Communication of Acceptance under section 29a of Patents Decree, Application No. 20206055, dated Jun. 22, 2021, 5 pages.

\* cited by examiner

OPTICAL ARRANGEMENT FOR PROVIDING PRIVACY

FIELD

The aspects of the disclosed embodiments relate to controlling visibility of graphical information displayed on a display.

BACKGROUND

A user may use a display device to display confidential information. The display device may be e.g. a phone or a portable computer. The display device may be used e.g. together with a screen protector film, which allows the user to view the confidential information from a first viewing point, but which may prevent a second person from viewing the confidential information from a second different viewing point. The display device may display the information by emitting light.

The protector film may comprise e.g. microscopic louvres, which allow light emitted from the display device to pass through the screen protector element only when the direction of propagation of the emitted light is in a predetermined angular range. The line of sight from the second viewing point to the display device may be outside the predetermined angular range, and the protector film may prevent propagation of emitted light from the display device to the second viewing point. The protector film may prevent propagation of emitted light to directions, which are outside the predetermined angular range. The screen protector element may appear as a dark area to the second person. Thus, the second person viewing the screen protector element from the second viewing point cannot see the displayed confidential information.

SUMMARY

Some variations relate to a masking device for controlling visibility of graphical information displayed on a display. Some variations relate to an apparatus, which comprises a display device and a masking device. Some variations relate to a method for controlling visibility of graphical information displayed on a display. Some variations relate to a method for displaying graphical information in a spatially selective manner. Some variations relate to a method for producing the masking device.

According to an aspect, there is provided a masking device (500), which comprises:
one or more first light sources (LED1a) to provide first input light (B0a),
a waveguiding substrate (SUB1), which has a first major surface (SRF1) and a second major surface (SRF2),
wherein an out-coupling region (REG1) of the substrate (SUB1) comprises a plurality of grooves (G1) implemented on the first major surface (SRF1) and/or on the second major surface (SRF2),
wherein the device (500) is arranged to form first guided light (B1a) by coupling the first input light (B0a) into the substrate (SUB1),
wherein the grooves (G1) are arranged to form first deflected light (B2a) by coupling the first guided light (B1a) out of the substrate (SUB1) through the second major surface (SRF2) of the substrate (SUB1).

According to an aspect, a masking device (500) disposed over a display (DISP1) has a first viewing region (ZONE1), a second viewing region (ZONE2), a first operating mode (MODE1), and a second operating mode (MODE2), wherein in the first operating mode (MODE1) the masking device (500) allows a first observer (EYE1) located in the first viewing region (ZONE1) to observe information (INFO1) displayed on the display (DISP1), and also allows a second observer (EYE2) located in the second viewing region (ZONE2) to observe the displayed information (INFO1), wherein in the second operating mode (MODE2) the masking device (500) projects light (B2a) to the second viewing region (ZONE2) so as to prevent the second observer (EYE2) from observing the displayed information (INFO1), while allowing first observer (EYE1) in first viewing region (ZONE1) to observe information (INFO1) displayed on the display (DISP1).

According to an aspect, there is provided an apparatus, comprising a display for displaying graphical information, and a masking device disposed over the display,
the masking device comprising:
one or more first light sources to provide first input light,
a waveguiding substrate, which has a first major surface and a second major surface,
wherein an out-coupling region of the substrate comprises a plurality of grooves implemented on the first major surface and/or on the second major surface,
wherein the masking device is arranged to form first guided light by coupling the first input light into the substrate,
wherein the grooves are arranged to form first deflected light by coupling the first guided light out of the substrate through the second major surface of the substrate,
wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region,
wherein the masking device has a protected operating mode where the masking device allows visually observing the displayed graphical information through the waveguiding substrate when viewed from a first viewing region, and where the masking device projects the first deflected light to a second viewing region so as to prevent visually observing the displayed graphical information through the waveguiding substrate when viewed from the second viewing region,
wherein the width of the grooves is smaller than 10 µm, wherein the width of the grooves is in the range of 0.5 µm to 10 µm, and wherein the depth of the grooves is in the range of 0.5 µm to 5 µm.

According to an aspect, there is provided a method for controlling visibility of information displayed on a display by using a masking device disposed over the display,
the masking device comprising:
one or more first light sources to provide first input light,
a waveguiding substrate, which has a first major surface and a second major surface,
wherein an out-coupling region of the substrate comprises a plurality of grooves implemented on the first major surface and/or on the second major surface,
wherein the masking device is arranged to form first guided light by coupling the first input light into the substrate,
wherein the grooves are arranged to form first deflected light by coupling the first guided light out of the substrate through the second major surface of the substrate, wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region, wherein the width of the grooves is smaller than 10 µm, wherein the width of the grooves is in the range of 0.5 µm to 10 µm, and wherein the depth of the grooves is in the range of 0.5 µm to 5 µm, wherein the method comprises:
operating the masking device in a first operating mode, wherein the masking device does not project first deflected light to a second viewing region, wherein the masking device allows visually observing the displayed graphical information through the waveguiding substrate when viewed from a first viewing region and when viewed from a second viewing region, and operating the masking device in a second protected operating mode, wherein the masking device projects the first deflected light to the second viewing region so as to prevent visually observing the displayed graphical information through the waveguiding substrate when viewed from the second viewing region, wherein the masking device allows visually observing the displayed graphical information through the waveguiding substrate when viewed from the first viewing region.

According to an aspect, there is provided a method for producing the grooves of the masking device by embossing.

The scope of protection sought for various embodiments of the present disclosure is set out by the independent claims. The embodiments, if any, described in this specification that do not fall under the scope of the independent claims are to be interpreted as examples useful for understanding various embodiments of the present disclosure.

The masking device may comprise light sources and a waveguiding substrate. The waveguiding substrate may be e.g. a plastic film or a glass plate or combination of them. The light source may be e.g. cold cathode fluorescent lamp (CCFL), a light emitting diode (LED) or a laser light source. The masking device may form guided light by coupling light of the light sources into the substrate. The guided light may propagate within the substrate such that the guided light is confined to the substrate by total internal reflection. The substrate may comprise a plurality of light-deflecting grooves to couple the guided light out of the substrate. The masking device may form deflected light by using the light-deflecting grooves to couple the guided light out of the substrate. The masking device may be arranged to project deflected light into a predetermined solid angle, which corresponds to a viewing region.

The masking device may be disposed over the display of a display device to control and limit the viewing angle of the display. The display device may be e.g. a phone, a tablet, or a portable computer.

The display may be arranged to display confidential information. The display may be e.g. a display of a point of sales terminal, a display of a banking terminal, a display of a check-in terminal, a display of a vehicle, or a display of a postal terminal. The display may be arranged to display visual information of a game, e.g. at a gambling casino. The display may be arranged to display visual information of a quiz or an exam, where one or more persons attempt to answer questions correctly.

The masking device may have two or more operating modes and two or more viewing regions. The masking device may have a first operating mode, which allows clear unobstructed viewing of the displayed information from a first viewing region and from a second viewing region. The substrate of the masking device may appear as a clear and transparent area to a first observer located in the first viewing region, and to a second observer located in the second viewing region. The masking device may provide a clear view from a first viewing region and from a second viewing region. The masking device may have an operating mode, where the masking device appears as clear and transparent to all viewing directions.

The area covered by the grooves within a region of the substrate may be e.g. smaller than 5% of the area of said region such that average optical attenuation ($\Delta I_{V0}/I_{V0}$) in said region is smaller than 20% for visible light, which is transmitted from the display through the substrate.

In a first operating mode (MODE1) the masking device (500) may allow a first observer (EYE1) located in the first viewing region (ZONE1) to observe information (INFO1) displayed on the display (DISP1), and may allow a second observer (EYE2) located in the second viewing region (ZONE2) to observe the displayed information (INFO1).

In a second operating mode (MODE2) the masking device (500) may project light (B2a) to the second viewing region (ZONE2) so as to prevent the second observer (EYE2) from observing the displayed information (INFO1), while allowing first observer (EYE1) in first viewing region (ZONE1) to observe information (INFO1) displayed on the display (DISP1).

The deflected light projected by the masking device may cause a dazzling effect, which prevents an observer from visually observing the displayed graphical information.

The deflected light projected by the masking device may also make it more difficult or impossible to capture a photo of the displayed information by using a camera, which is located in the second viewing region.

The masking device may be temporarily or permanently disposed over a display device, for controlling visibility of information displayed on a display of the display device. The masking device may be used as a transparent protective screen, which may prevent observing confidential displayed information from one or more viewing regions. The masking device may operate as a controllable directional mask. The protective functionality of the masking device may be enabled and disabled by switching light sources on and off.

The masking device may provide privacy e.g. when a user of the display device is attending a meeting or traveling with other people e.g. in an airplane. The masking device may protect confidential information displayed on the display device.

Projecting the deflected light may be enabled and disabled by controlling operation of the light sources. One or more protective functionalities of the masking device may be enabled and disabled by controlling operation of the light.

The light-deflecting grooves of the waveguiding substrate may be so narrow, and the distance between adjacent light-deflecting grooves may be so small that it is difficult or impossible to discern an individual groove from the adjacent grooves by viewing the surface of the substrate with unaided naked eye. The maximum distance between adjacent light-deflecting grooves may be e.g. smaller than 0.6 mm. The width of the grooves may be e.g. smaller than m. Consequently, the substrate may visually appear as a clear transparent element.

In an embodiment, the masking device may comprise two or more independently controlled groups of light sources.

In an embodiment, the angular intensity distribution of deflected light may have two or more independently controllable lobes.

The combination of the masking device and the display may operate such that the masking device does not significantly attenuate light emitted from the display. The angular width of the viewing sector of the combination may be changed without manually removing one or more layers or parts from the combination.

As a comparative example, a micro louvre film may be temporarily disposed on a display in order to provide a narrow viewing sector, but the micro louvre film may need to be removed manually.

As a comparative example, a micro louvre film may be disposed on a display in order to provide a narrow viewing sector, but the micro louvre film may reduce the maximum brightness of the display and may cause loss of light also in the desired narrow viewing sector.

BRIEF DESCRIPTION OF THE DRAWINGS

In the following examples, several variations will be described in more detail with reference to the appended drawings, in which.

DETAILED DESCRIPTION

Figure 1A:
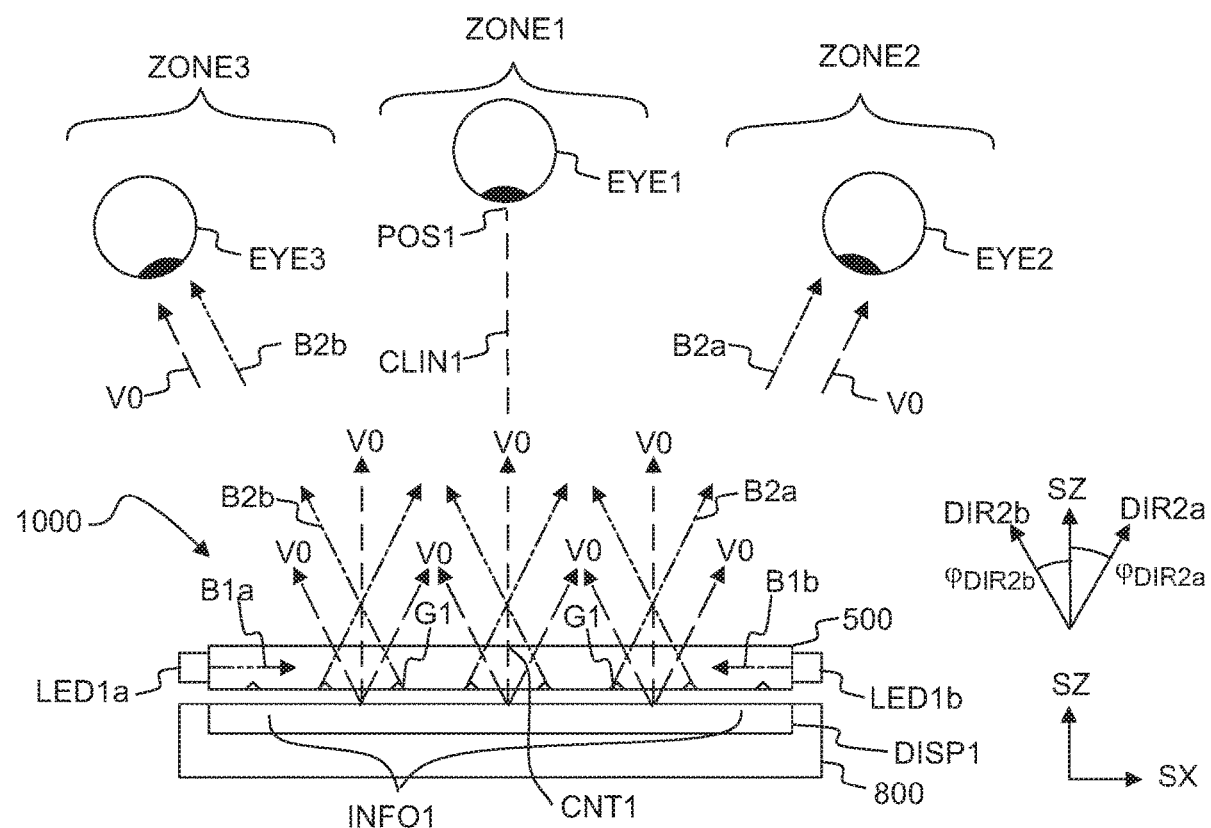
FIG. 1a shows, by way of example, in a side view, a masking device disposed over a display device.

Referring to FIG. 1a, a masking device 500 may be disposed over a display DISP1 of a display device 800. The masking device 500 may be disposed over the display DISP1 such that the masking device 500 is in contact with the display DISP1, or such that there is a gap between the masking device 500 and the display DISP1. The device 500 may be stacked with the display 500. An apparatus 1000 may comprise the masking device 500 and the display device 800.

The display device 800 may be e.g. phone, a tablet, a portable computer, a computer monitor, or a television. The display DISP1 may be e.g. an LCD display, PLASMA, OLED, or a QD display. LCD means liquid crystal display. OLED means organic light emitting diode. QD means quantum dot.

The display DISP1 may be arranged to display graphical information INFO1 on the display DISP1. For example, the information INFO1 may be displayed as an image, photo, video and/or text. The graphical information INFO1 may be e.g. text, numbers, pictures and/or video. The information INFO1 may be e.g. a graphical image. The information INFO1 may be e.g. confidential information, secret information, non-public information and/or personal information. The display DISP1 may emit information-carrying light V0, which represents the displayed information INFO1. The information-carrying light V0 may carry the displayed information INFO1 to the eye of an observer EYE1, EYE2, EYE3.

An observer EYE1 located in a first viewing region ZONE1 may observe the information INFO1 displayed on the display DISP1. The first viewing region ZONE1 may be above a center CNT1 of the substrate SUB1 of the masking device 500. The first viewing region ZONE1 may include viewing positions POS1, which are on the centerline CLIN1, which is perpendicular to the major surfaces SRF1, SRF2 of the substrate SUB1, wherein the centerline CLIN1 intersects the center CNT1 of the substrate SUB1.

The masking device 500 may be arranged to project first deflected light B2a to a second viewing region ZONE2, so as to make it difficult or impossible for an observer EYE2 located in the second viewing region ZONE2 to observe the information INFO1 displayed on the display DISP1.

The masking device 500 may be arranged to project second deflected light B2b to a third viewing region ZONE3, so as to make it difficult or impossible for an observer EYE3 located in the third viewing region ZONE3 to observe the information INFO1 displayed on the display DISP1.

The masking device 500 may be arranged to operate such that the observer EYE1 located in a first viewing region ZONE1 may observe the information INFO1 displayed on the display DISP1 also during projecting the first deflected light (B2a) and/or during projecting the second deflected light (B2b). The masking device 500 may be arranged to operate such that the intensity deflected light in the first viewing region ZONE1 is lower than a limit value, so as to allow observing the information INFO1 displayed on the display DISP1

An observer EYE1, EYE2, EYE3 may observe the displayed information INFO1 when the information-carrying light V0 impinges on the eye of said observer, provided that the visual edge contrast of the information-carrying light V0 is sufficient to allow visual observation. A graphical pattern displayed on the display DISP1 may comprise an edge between a bright region and a dark region of the displayed graphical pattern. The visual edge contrast may mean the relative difference $(I_{HIGH}-I_{LOW})/I_{HIGH}$. The symbol $I_{HIGH}$ may denote the intensity of the bright region, when detected at the position of the eye. The symbol $I_{LOW}$ may denote the intensity of the dark region, when detected at the same position of the eye.

The masking device 500 may project first deflected light B2a to a second viewing region ZONE2 so as to make it difficult or impossible to observe the displayed information INFO1 from the second viewing region ZONE2. The deflected light B2a may reduce the visual edge contrast so that observing the displayed information becomes difficult or impossible. The deflected light B2a may reduce the visual edge contrast by adding an intensity value $I_{B2a}$ to both intensity values $I_{HIGH}$ and $I_{LOW}$. Consequently, the reduced visual edge contrast may be equal to $((I_{HIGH}+I_{B2a})-(I_{LOW}+I_{B2a}))/(I_{HIGH}+I_{B2a})$.

For example, the masking device 500 may be arranged to provide first deflected light B2a to the second viewing region ZONE2 such that the intensity $I_{B2a}$ of the first deflected light B2a is greater than the maximum intensity $(I_{V0})$ of the information-carrying light V0 emitted from the display DISP1, at a viewing point located in the second viewing region ZONE2.

For example, the masking device 500 may be arranged to provide first deflected light B2a to the second viewing region ZONE2 such that the intensity $I_{B2a}$ of the first deflected light B2a is greater than 10 times the maximum intensity $(I_{V0})$ of the information-carrying light V0 emitted from the display DISP1, at a viewing point located in the second viewing region ZONE2.

The masking device may have a first viewing region ZONE1 and a second viewing region ZONE2. The substrate of the masking device may always appear as a clear transparent element to the observer EYE1 located in the first viewing region. The masking device may have a first operating mode MODE1 and a second operating mode MODE2. The substrate of the masking device may appear either as a bright luminous element or as a clear transparent element for an observer EYE2 located in a second viewing region ZONE2 of the masking device, depending on the operating mode of the masking device.

An observer EYE1 located in the first viewing region ZONE1 may see the information displayed on the display in the first operating mode MODE1 and also in the second operating mode MODE2.

In the first operating mode MODE1, the masking device does not project dazzling light towards the second viewing region ZONE2. In the second operating mode MODE2, the masking device projects dazzling deflected light towards the second viewing region ZONE2. An observer EYE2 located in the second viewing region ZONE2 may see the information displayed on the display in the first operating mode MODE1, wherein the observer EYE2 located in the second viewing region ZONE2 cannot see the information displayed on the display in the second operating mode MODE2.

In the first operating mode MODE1, an observer EYE1 located in the first viewing region ZONE1 and an observer EYE2 located in the second viewing region ZONE2 may observe the same information. In the first operating mode MODE1, the substrate of the masking device may appear as a clear transparent element for an observer located in the first viewing region ZONE1 and for an observer located in the second viewing region ZONE2.

In the second operating mode MODE2, an observer located in the first viewing region ZONE1 may observe the displayed information, but an observer located in the second viewing region ZONE2 cannot observe the displayed information. In the second operating mode MODE2, the substrate of the masking device may appear as a clear transparent element for an observer located in the first viewing region ZONE1, but the substrate of the masking device may appear as a bright luminous element for an observer located in the second viewing region ZONE2.

In the second operating mode MODE2, the substrate of the masking device may operate as a luminous element, which prevents visual observation of the displayed confidential information by projecting dazzling light towards the second viewing region. The masking device may be arranged to protect confidential information displayed on the display.

The substrate of the masking device may appear as a bright luminous element to an observer, who is located in a second viewing region, which is outside the first viewing region. The visual brightness of the substrate may be so high that it prevents an observer from observing information displayed on the display. The deflected light may cause a dazzling effect to an observer, who is located in the second viewing region. At the same time, the observer located in the first viewing zone may still observe the information displayed on the display. The substrate of the masking device may appear as a clear transparent element to the observer located in the first viewing region.

The masking device 500 may also have a third viewing region ZONE3 and a third operating mode (MODE3), wherein in the third operating mode (MODE3):

the masking device (500) may project second deflected light (B2b) to the third viewing region (ZONE3) so as to prevent visually observing the displayed graphical information (INFO1) through the waveguiding substrate (SUB1) when viewed from the third viewing region (ZONE3), and the masking device (500) may allow visually observing the displayed graphical information (INFO1) through the waveguiding substrate (SUB1) when viewed from the first viewing region (ZONE1) and when viewed from the second viewing region (ZONE2).

The masking device 500 may also have a fourth operating mode MODE4, where the masking device 500 simultaneously projects the first deflected light B2a and the second deflected light B2b. In the fourth operating mode MODE4, the masking device 500 may allow visually observing the displayed graphical information INFO1 through the waveguiding substrate SUB1 only when viewed from the first viewing region ZONE1.

Figure 1B:
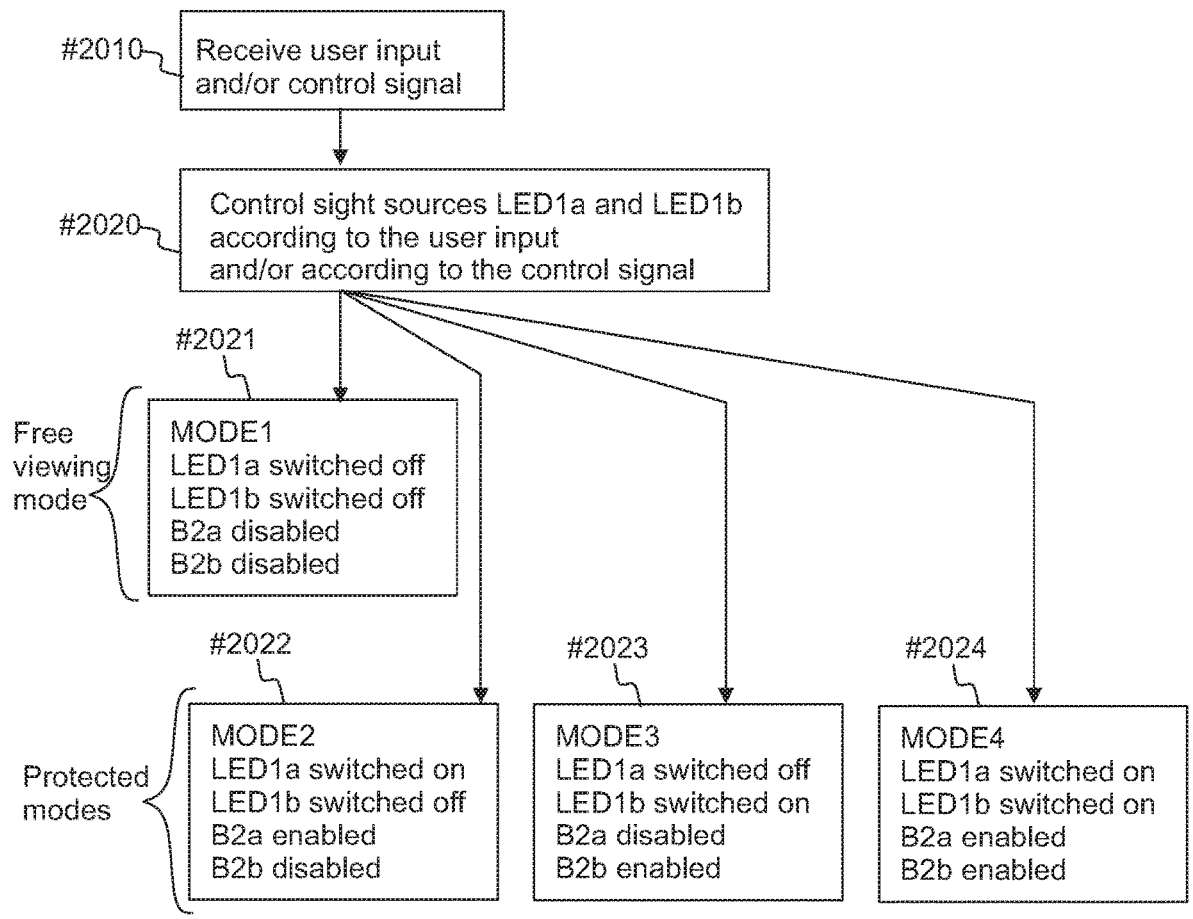
FIG. 1b shows, by way of example, method steps for controlling operation of the masking device.

FIG. 1b shows, by way of example, method steps for controlling visibility of information INFO1 displayed on the display DISP1.

User input or control signal ($S_{MODE}$) may be received in step 2010. The user input may be received e.g. via a user interface (UIF1, see FIG. 5b)). The control signal ($S_{MODE}$) may be received e.g. via a communication unit (RXTX1, see FIG. 5b).

Operation of one or more light sources LED1a, LED1b may be controlled according to the user input or control signal in step 2020. The masking device 500 may be arranged to start operation in an operating mode (MODE1, MODE2, MODE3, MODE4) indicated by the user input or control signal.

For example, the first light sources LED1a and the second light sources LED2b may be switched off in a situation where the user input or control signal indicates operation in the free viewing mode MODE1 (step 2021).

For example, the first light sources LED1a may be switched on and the second light sources LED1b may be switched off in a situation where the user input or control signal indicates operation in the second mode MODE2 (step 2022).

For example, the first light sources LED1a may be switched off and the second light sources LED1b may be switched on in a situation where the user input or control signal indicates operation in the third mode MODE3 (step 2023).

For example, the first light sources LED1a may be switched on and the second light sources LED1b may be switched on in a situation where the user input or control signal indicates operation in the fourth mode MODE4 (step 2024).

The user input may sometimes be in contradiction with the control signal. For example, a user may instruct operation in a protected mode when the control signal indicates a free viewing mode (MODE1). The masking device 500 may be arranged to operate e.g. such that the user input prevails over the control signal. Alternatively, the masking device 500 may be arranged to operate in a protected mode (e.g. MODE4) always when the user input is in contradiction with the control signal.

Figure 2A:
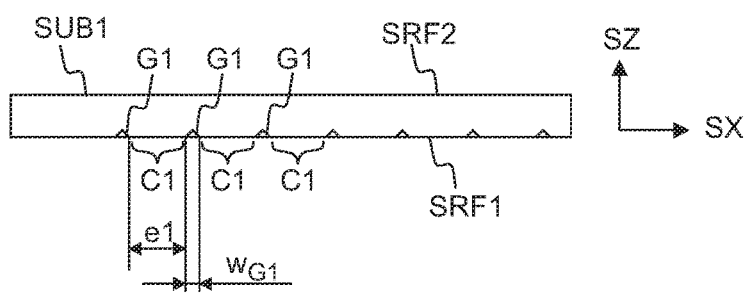
FIG. 2a shows, by way of example, in a cross-sectional side view, a waveguiding substrate of the masking device.
Figure 2B:
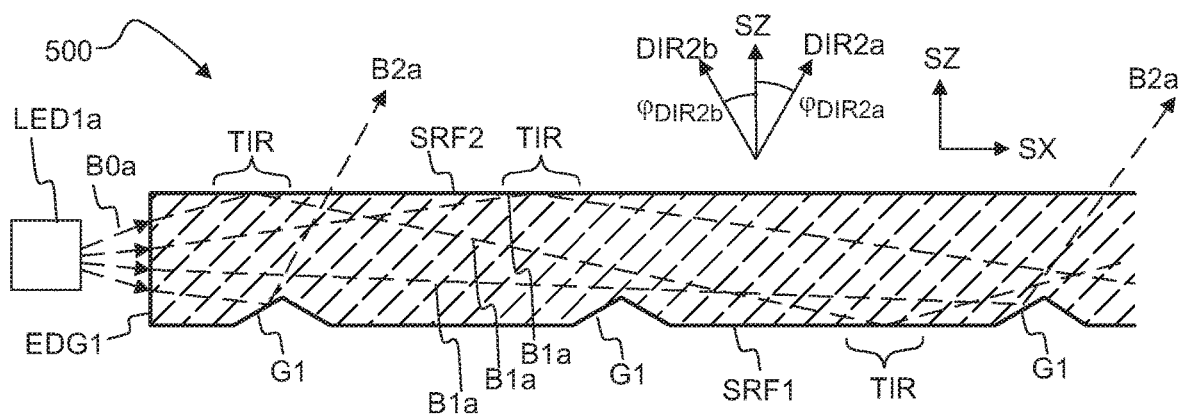
FIG. 2b shows, by way of example, in a cross-sectional side view, coupling of light into the waveguiding substrate, and coupling of light out of the waveguiding substrate.

Referring to FIGS. 2a and 2b, the masking device 500 may comprise a waveguiding substrate SUB1, a plurality of light-deflecting grooves G1, and one or more light sources LED1a. The light sources LED1a may emit input light B0a. The input light B0a may be coupled into the substrate SUB1 so as to form waveguided light B1a. The waveguided light B1a may propagate within the substrate SUB1. The waveguided light B1a may be confined to the substrate SUB1 by total internal reflection (TIR).

The symbol $w_{G1}$ may denote the depth of grooves G1. The symbol $e_1$ may denote the width of flat clear regions C1 between adjacent grooves G1.

SX, SY, and SZ may denote orthogonal directions. The substrate SUB1 may comprise a first major surface SRF1 and a second major surface SRF2. The major surfaces SRF1, SRF2 may be substantially planar, and the major surfaces SRF1, SRF2 may be substantially parallel with each other. The major surfaces SRF1, SRF2 may be parallel with the plane defined by the directions SX, SY. The direction SZ may be perpendicular to the major surfaces SRF1, SRF2 of the substrate SUB1.

The masking device 500 may project first deflected light B2a such that the first deflected light B2a has an angular intensity maximum in a first inclined projecting direction DIR2a. The masking device 500 may also project second deflected light B2b such that the second deflected light B2b has an angular intensity maximum in a second inclined projecting direction DIR2b (FIG. 2f). $\varphi_{DIR2a}$ denotes an angle between the projecting direction DIR2a and a reference plane REF2 defined by the directions SZ and SY. $\varphi_{DIR2b}$ denotes an angle between the projecting direction DIR2b and the reference plane REF2. The angle $\varphi_{DIR2b}$ may be equal to the angle $\varphi_{DIR2a}$, or the angle $\varphi_{DIR2b}$ may be different from the angle $\varphi_{DIR2a}$. The angle $\varphi_{DIR2a}$ may be e.g. in the range 20° to 75° (see FIG. 4b). The angle $\varphi_{DIR2b}$ may be e.g. in the range 20° to 75°. The direction DIR2a and/or the direction DIR2b may be e.g. in a plane defined by the directions SX and SZ.

Waveguided light B1a propagating within the substrate SUB1 is trapped within the substrate SUB1 by total internal reflection (TIR) until the guided light B1a encounters a deflecting groove G1. When the guided light B1a encounters a deflecting groove G1, a part of the guided light B1a may be deflected out of the substrate SUB1 e.g. to the second viewing region ZONE2. The deflected light (B2a) may make the substrate SUB1 to appear as a bright luminous element to the second viewing region ZONE2.

The microscopic light-deflecting grooves G1 may be arranged to form a deflected light beam B2a by scattering the waveguided light B1a. The light-deflecting grooves G1 may direct the deflected light beam B2a to the second viewing region ZONE2 for obstructing the vision of an observer EYE2 located in said second viewing region ZONE2.

The deflected light B2a may cause a dazzling effect. The masking device 500 may be arranged to provide dazzling deflected light B2a to the second viewing region ZONE2 so as to make it more difficult or impossible for an observer EYE2 to visually observe information displayed on the display DISP1. The masking device 500 may be arranged to provide the dazzling deflected light B2a such that the intensity of the dazzling deflected light B2a (at a position of the eye of the observer EYE2) is greater than the intensity of the information carrying light V0 at the position of the eye of the observer EYE2.

The substrate SUB1 may comprise a plurality of clear viewing portions C1 between adjacent light deflecting grooves G1 so that the substrate SUB1 may visually appear as a homogeneous clear transparent element. The observer or observers EYE1, EYE2, EYE3 located in the different viewing regions ZONE1, ZONE2, ZONE3 may observe the information displayed on the display, by looking through clear viewing portions C1 of the substrate SUB1. The clear viewing portions C1 may allow unobstructed viewing through the substrate SUB1.

Waveguided light B1a may be confined to the substrate SUB1 by total internal reflection, which takes place at the major surfaces SRF1, SRF2 of the substrate SUB1. The waveguided light B1a may also be called simply as guided light B1. The waveguiding substrate may operate as a light guide. The waveguided light B1a may propagate within the substrate SUB1 in a transverse direction (e.g. in the direction SX).

Figure 2C:
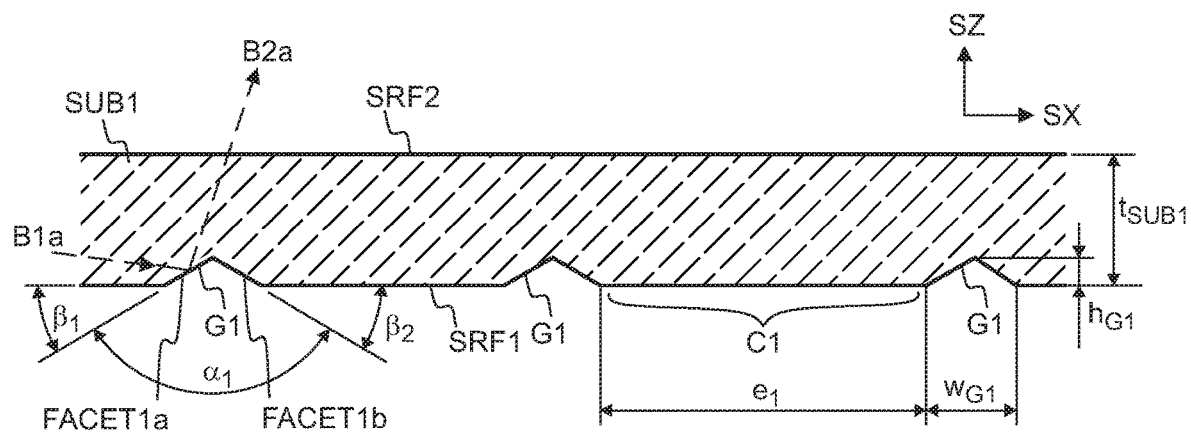
FIG. 2c shows, by way of example, in a cross-sectional side view, dimensions of light-deflecting grooves of the waveguiding substrate.

Referring to FIG. 2c, a plurality of light-deflecting grooves G1 may be implemented on a major surface SRF1 and/or SRF2 of the substrate SUB1. The light-deflecting groove G1 may have a width $w_{G1}$ and a depth $h_{G1}$. The cross-section of the light-deflecting groove G1 may have a width $w_{G1}$ and a depth $h_{G1}$.

The groove G1 may have light-scattering facets FACET1a, FACET1b. The angle $\beta_1$ may denote an orientation angle between a first facet FACET1a and the major surface SRF1. The orientation angle $\beta_1$ may be equal to the angle between the surface normal of the facet FACET1a and the surface normal of the major surface SRF1.

The angle $\beta_2$ may denote an orientation angle between a second facet FACET1b and the major surface SRF1. The angle $\beta_2$ may be e.g. substantially equal to the angle $\beta_1$ (symmetric groove), or the angle $\beta_2$ may be different from the angle $\beta_1$ (i.e. the groove may be asymmetric). The angle $\beta_1$ may be selected to provide a desired angular intensity distribution $I_{B2a}(\varphi)$ of first deflected light B2a. The angle $\beta_2$ may be selected to provide a desired angular intensity distribution $I_{B2b}(\varphi)$ of second deflected light B2b.

The substrate SUB1 may comprise a plurality of grooves G1 implemented on the first major surface SRF1. The grooves G1 of the first major surface SRF1 may be arranged to form the deflected light B2a, B2b using reflective facets FACET1a, FACET1b. The orientation angles $\beta_1$ of reflective facets FACET1a may be e.g. in the range of 10° to 60°. The orientation angles $\beta_2$ of reflective facets FACET1b may be e.g. in the range of 10° to 60°. The reflective facets may reflect the guided light e.g. by total internal reflection.

The grooves G1 may have a triangular cross section. The apex angle $\alpha 1$ of the groove G1 may be equal to $180°-(\beta_1+\beta_2)$.

The microscopic light-deflecting grooves G1 may be so narrow and the light-deflecting grooves G1 may be so close to each other that that it may be difficult or impossible to discern an individual light deflecting groove G1 by an unaided naked human eye.

The eye of the observer (EYE1, EYE2, EYE3) naturally focuses to the displayed information INFO1, rather than focusing to the narrow weakly discernible grooves G1 of the substrate SUB1. The human eye tends to automatically focus to a displayed graphical information (INFO1) behind the substrate SUB1, instead of focusing to the narrow grooves G1. The distance between the display DISP1 and the observer EYE1 may be greater than the distance between the grooves G1 and the observer EYE1. Consequently, the narrow grooves G1 of the substrate SUB1 may typically be out of focus of the eye of the human observer (EYE1, EYE2, EYE3). Said defocusing of the eye may make it difficult or impossible to visually discern the individual grooves G1 from the neighboring grooves G1 when the widths of the grooves are e.g. smaller than 10 μm and when the distances $e_1$ between the adjacent grooves G1 are e.g. smaller than 0.6 mm. The adjacent grooves G1 may together appear to the first observer (EYE1) as a substantially uniform region. The substrate SUB1 may appear to have a substantially uniform surface when viewed by the naked human eye.

The grooves G1 may be so narrow and the grooves G1 may be so close to each other that the grooves G1 do not significantly obstruct the clear vision of the first observer EYE1, even in a situation where projecting of the deflected light B2a and/or B2b is enabled.

The adjacent grooves G1 may together appear to the first observer EYE1 as a substantially uniform weakly luminous region, in a situation where projecting of the deflected light B2a and/or B2b is enabled.

The distance between the adjacent grooves G1 of the substrate SUB1 may be e.g. smaller than 0.6 mm, so as to make it difficult or impossible to discern the individual grooves G1. The substrate SUB1 may comprise a plurality of clear viewing regions C1 defined between adjacent grooves G1 such that the maximum distance from any point of the clear viewing regions C1 to the closest groove G1 may be e.g. smaller than 0.3 mm, respectively.

The average distance $e_1$ between adjacent grooves G1 may be smaller than 0.6 mm, preferably smaller than 0.4 mm. The average number density of the grooves G1 may be e.g. in the range of 1.6 grooves per mm to 20 grooves per mm.

The total area covered by the light-deflecting grooves G1 may be small when compared with the combined area of the clear viewing portions (C1) of the substrate SUB1, so as to provide substantially unobstructed view through the substrate SUB1. The total area covered by the light-deflecting grooves G1 may be e.g. smaller than 5% of the area of the first major surface SRF1 of the substrate SUB1. The total (combined) area of the clear viewing regions C1 may be e.g. greater than 95% of the area of the first major surface SRF1.

For example, the substrate SUB1 may comprise a plurality of light-deflecting grooves G1 such that the width $w_{G1}$ of the grooves G1 is e.g. in the range of 0.5 μm to 10 μm, the average distance $e_1$ between adjacent grooves G1 is smaller than 0.6 mm, and the total area covered by the grooves G1 is smaller than 5% of the area of the first major surface SRF1 of the substrate SUB1.

The light-deflecting grooves G1 and the clear viewing regions C1 may together cover e.g. at least 90% of a total viewing area of a display DISP1, so as to effectively protect the displayed information.

In an embodiment, it is not needed to protect the entire viewing area of a display DISP1. A protectable area of the display DISP1 may also be smaller than the total viewing area of the display DISP1. In that case the light-deflecting grooves G1 and the clear viewing regions C1 may together cover e.g. at least 90% of the protectable viewing area of a display DISP1, so as to effectively protect the sensitive information of the display.

Figure 12A:
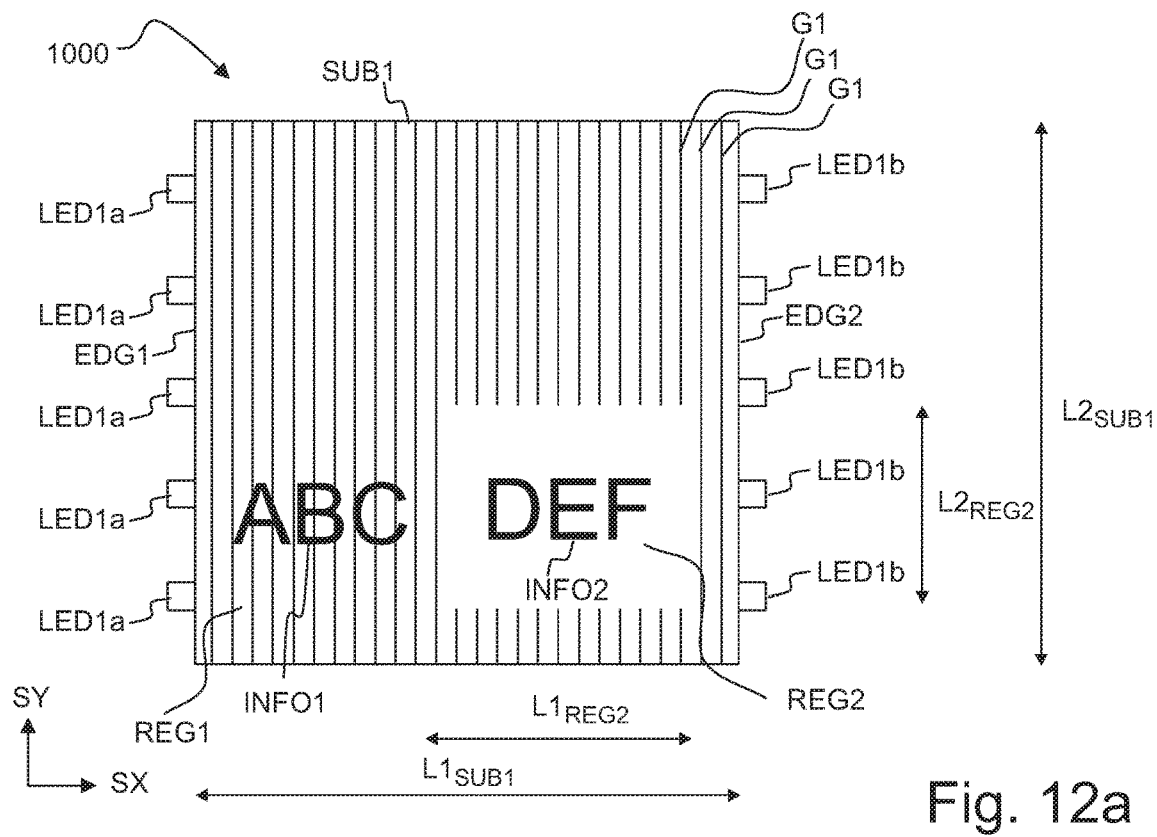
FIG. 12a shows by way of example, in a top view, a substrate which comprises a first out-coupling portion and a second portion.
Figure 12B:
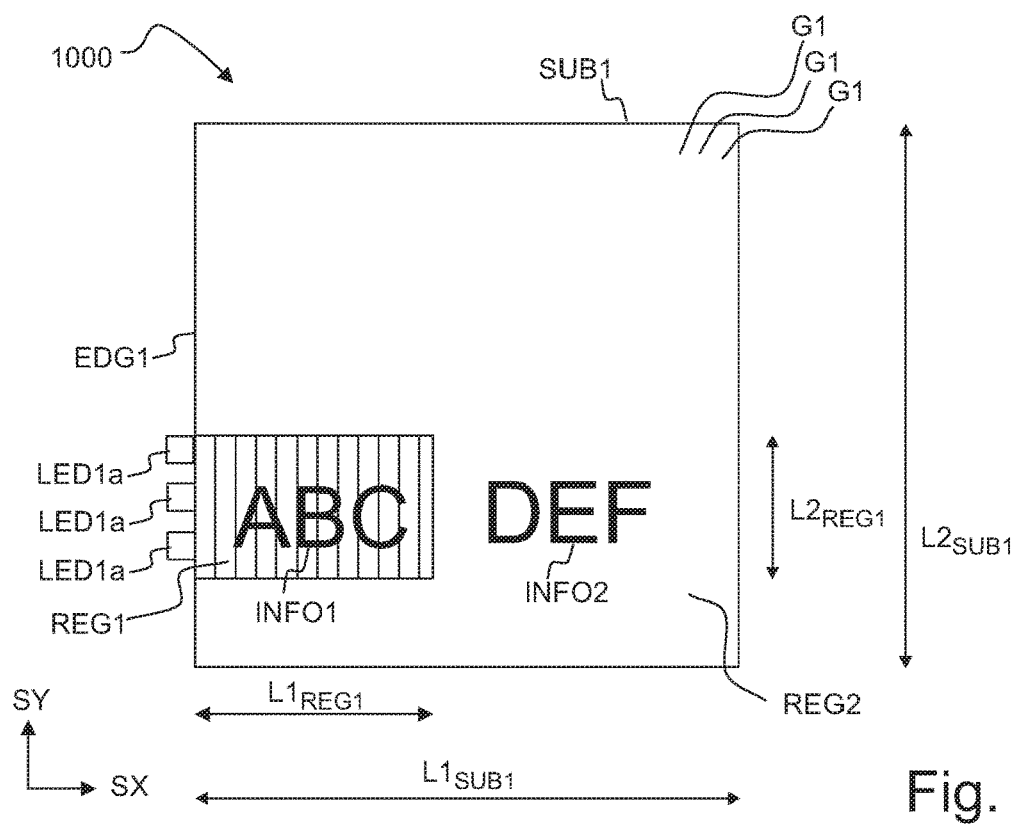
FIG. 12b shows by way of example, in a top view, a substrate which comprises a first out-coupling portion and a second portion.
Figure 12C:
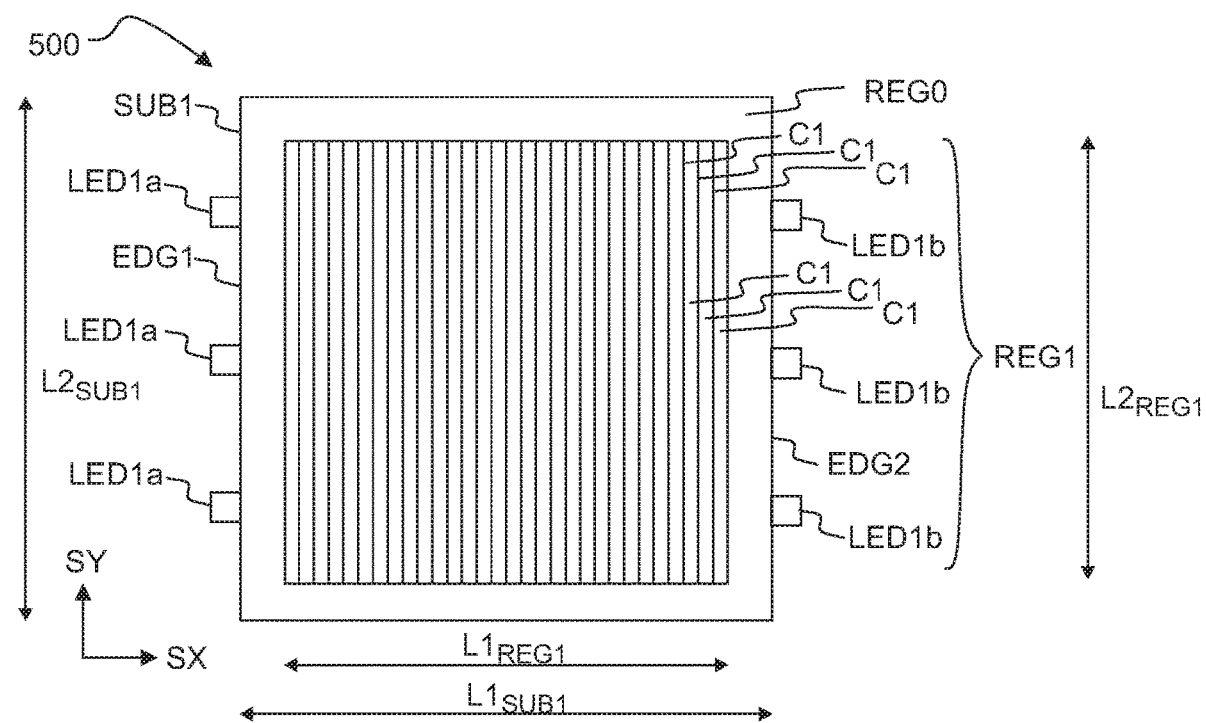
FIG. 12c shows by way of example, in a top view, a substrate which comprises a first out-coupling portion and a second portion.

The substrate SUB1 may comprise one or more out-coupling regions REG1 (see e.g. FIG. 12b, FIG. 12c). A plurality of grooves G1 may be implemented on the major surface SRF1 and/or SRF2. The area of the coupling region REG1 may also be smaller than or equal to the area of the major surface SRF1, SRF2. The out-coupling region REG1 is a spatial area, which comprises a plurality of grooves G1 implemented on the first major surface SRF1 and/or on the second major surface SRF2.

For example, the substrate SUB1 may comprise at least one region REG1, which comprises a plurality of light-deflecting grooves G1 such that the width $w_{G1}$ of the grooves G1 is e.g. in the range of 0.5 μm to 10 μm, the depth $h_{G1}$ of the grooves G1 may be in the range of 0.5 μm to 5 μm. The average distance $e_1$ between adjacent grooves G1 in said region may be e.g. smaller than 0.6 mm. The total area covered by the grooves G1 may be e.g. smaller than 5% of the area of said region (REG1).

For example, an out-coupling region REG1 of the substrate SUB1 may comprise a plurality of light-deflecting grooves G1 such that the width $w_{G1}$ of the grooves G1 is e.g. in the range of 1 μm to 10 μm, and the depth $h_{G1}$ of the grooves G1 may be in the range of 0.5 μm to 5 μm. The average distance $e_1$ between adjacent grooves G1 may be e.g. smaller than 0.6 mm. The total area covered by the grooves G1 of the out-coupling region REG1 may be e.g. smaller than 5% of the area of the out-coupling region REG1. The average number density of the grooves G1 in the out-coupling region REG1 may be e.g. in the range of 1.6 grooves per mm to 20 grooves per mm. The dimensions $L1_{REG1}$ and $L2_{REG1}$ of the region REG1 may be e.g. greater than 5 cm. The size of the region REG1 may be e.g. greater than 5 cm×5 cm.

The grooves G1 may together cover a fraction $F_{G1}$ of the area of the out-coupling region REG1. The fraction $F_{G1}$ may be defined by the equation $F_{G1}=A_{G1}/A_{REG1}$, where $A_{G1}$ denotes the total area covered by the grooves G1 within the out-coupling region REG1, and $A_{REG1}$ denotes the area of the out-coupling region REG1. The fraction $F_{G1}$ may also be called as the coverage ratio of the grooves G1. The area $A_{C1}$ covered by the flat smooth regions C1 within the out-coupling region REG1 is equal to $A_{REG1}-A_{G1}$. The flat smooth regions C1 may together cover a fraction $F_{C1}$ of the out-coupling region REG1. The fraction $F_{C1}$ may be defined by the equation $F_{C1}=1-A_{G1}/A_{REG1}$. The fraction $F_{C1}$ may also be called as the coverage ratio of the flat regions C1. The sum of the coverage ratio $F_{G1}$ of the grooves G1 and the coverage ratio $F_{C1}$ of the flat regions C1 may be equal to one.

The grooves G1 may cause a loss $\Delta I_{V0}$ of intensity $I_{V0}$ of light V0, which is transmitted through the substrate SUB1. The grooves G1 may cause optical attenuation ($\Delta I_{V0}/I_{V0}$).

To the first approximation, the optical attenuation ($\Delta I_{V0}/I_{V0}$) caused by the grooves G1 may be e.g. approximately equal to 2-$F_{G1}$. To the first approximation, the extinction cross section of a single groove may be approximately equal to two times the area covered by said single groove. The area covered by a single groove G1 within the region REG1 is equal to the width $w_{G1}$ of the groove G1 multiplied by the length ($L_{G1}$) of said groove G1 within said region REG1.

Thanks to the small surface coverage ratio $F_{G1}$ of the grooves G1, the optical attenuation caused by the grooves may be low. Thanks to the small surface coverage ratio $F_{G1}$ of the grooves G1, the optical transmittance of the wave-guiding substrate may be high, respectively.

The area covered by the grooves G1 within the out-coupling region REG1 may be e.g. smaller than 5% of the area of the out-coupling region REG1, such that average optical attenuation ($\Delta I_{V0}/I_{V0}$) in the out-coupling region REG1 may be e.g. smaller than 20% for visible light V0, which is transmitted through the substrate SUB1 in a direction (SZ), which is perpendicular to the first major surface SRF1. Said average optical attenuation ($\Delta I_{V0}/I_{V0}$) may be the average value of optical attenuation over the out-coupling region REG1. The average optical attenuation may also be called as the spatially averaged optical attenuation. The average attenuation may be e.g. smaller than 20% in the visible range of wavelengths from 400 nm to 760 nm. The average attenuation may include attenuation caused by the grooves G1, attenuation caused by reflection loss at the first major surface SRF1, and attenuation caused by reflection loss at the second major surface SRF2.

The average optical transmittance may be e.g. greater than 80%, respectively. The average optical transmittance of the waveguiding substrate SUB1 for visible light V0 transmitted in a perpendicular direction SZ through the waveguiding substrate SUB1 may be e.g. greater than 80% in the visible range of wavelengths from 400 nm to 760 nm. The average optical transmittance may be the average value of optical transmittance over the out-coupling region REG1. The average transmittance may be e.g. greater than 80% in the visible range of wavelengths from 400 nm to 760 nm. The spatially averaged optical transmittance of the waveguiding substrate may take into account the intensity-reducing effect of the grooves G1, the effect of reflection losses at the surfaces SRF1, SRF2, and the effect of absorption of light inside the substrate.

The substrate SUB1 may be substantially rectangular, when viewed in a direction SZ, which is perpendicular to the major surfaces SRF1, SRF2.

The substrate SUB1 may have a dimension $L1_{SUB1}$ in the direction SX, and a dimension $L2_{SUB1}$ in the direction SY.

In an embodiment, the masking device 500 may be suitable for protecting the display of a phone or a portable computer. The dimensions ($L1_{SUB1}$, $L2_{SUB1}$) may be e.g. in the range of 0.05 µm to 0.5 µm.

Figure 11A:
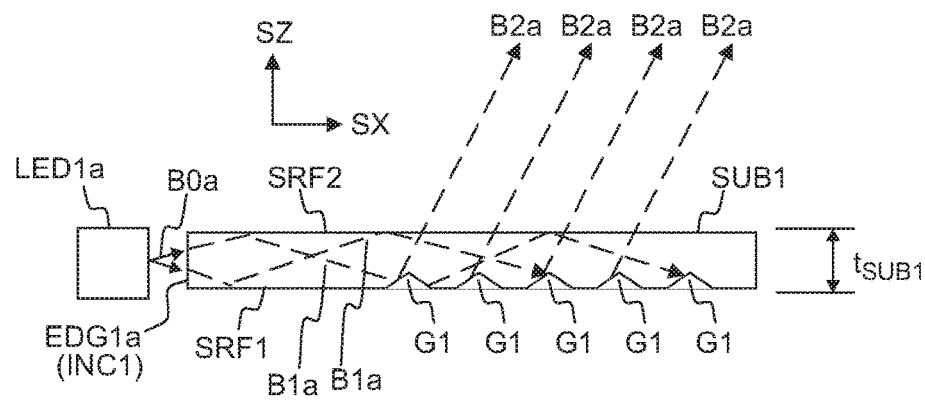
FIG. 11a shows, by way of example, in a cross-sectional side view, coupling of light into the substrate via an edge facet.
Figure 11B:
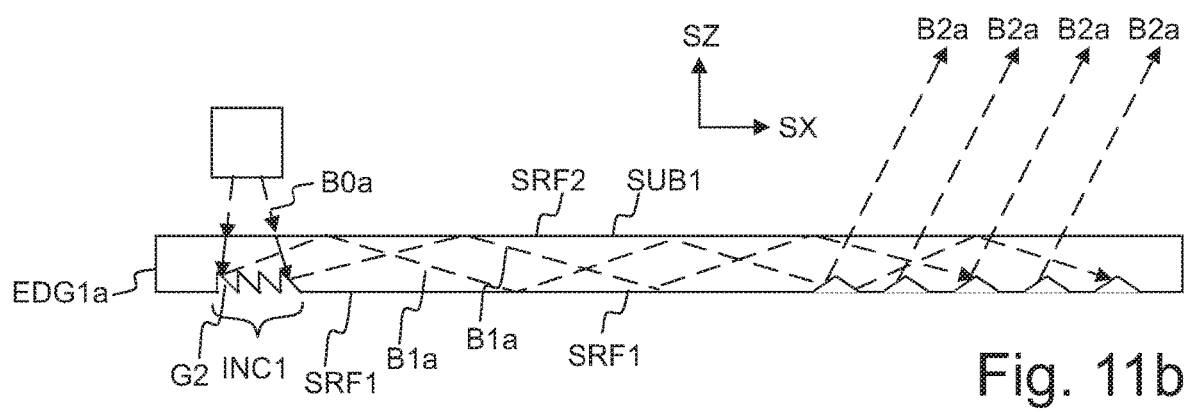
FIG. 11b shows, by way of example, in a cross-sectional side view, coupling of light into the substrate via a major surface of the substrate, by using an in-coupling element.
Figure 11C:
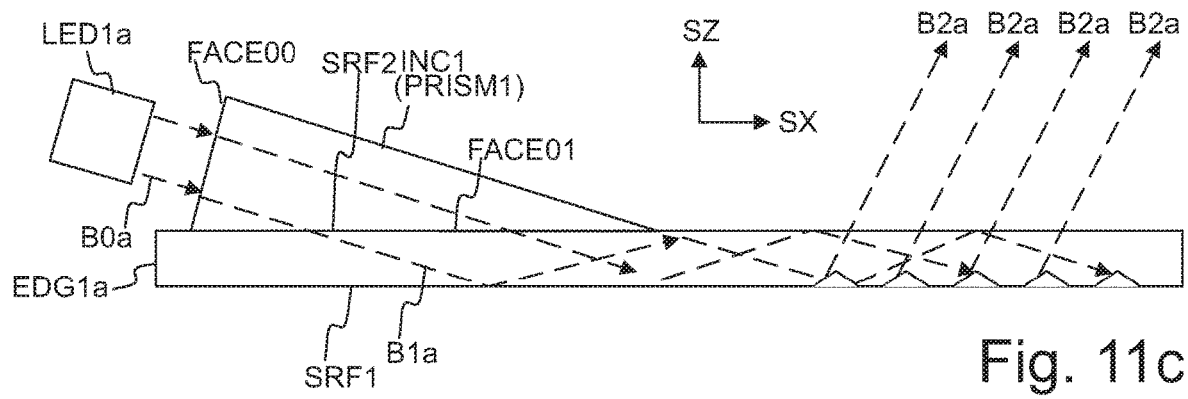
FIG. 11c shows, by way of example, in a cross-sectional side view, coupling of light into the substrate via a major surface of the substrate, by using an in-coupling prism.
Figure 11D:
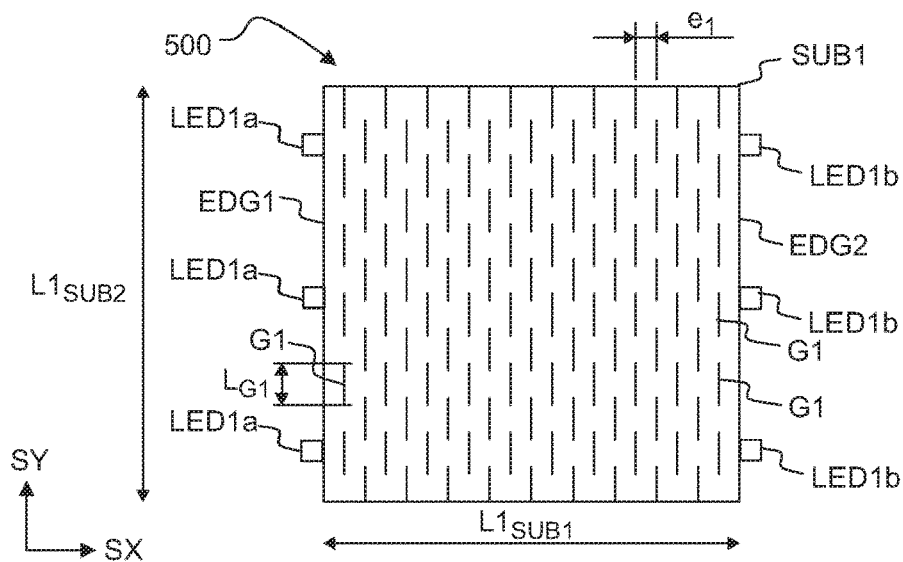
FIG. 11d shows, by way of example, in a top view, a substrate which comprises short grooves.
Figure 11E:
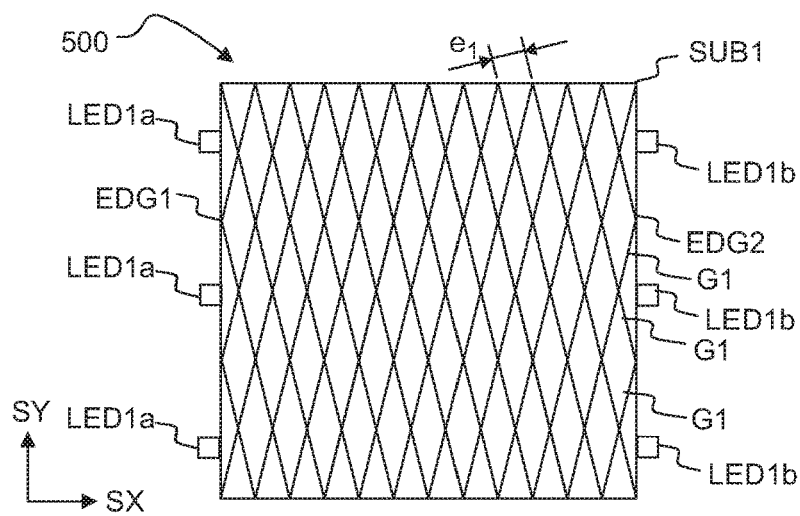
FIG. 11e shows, by way of example, in a top view, a substrate which comprises grooves which have different orientations.
Figure 11F:
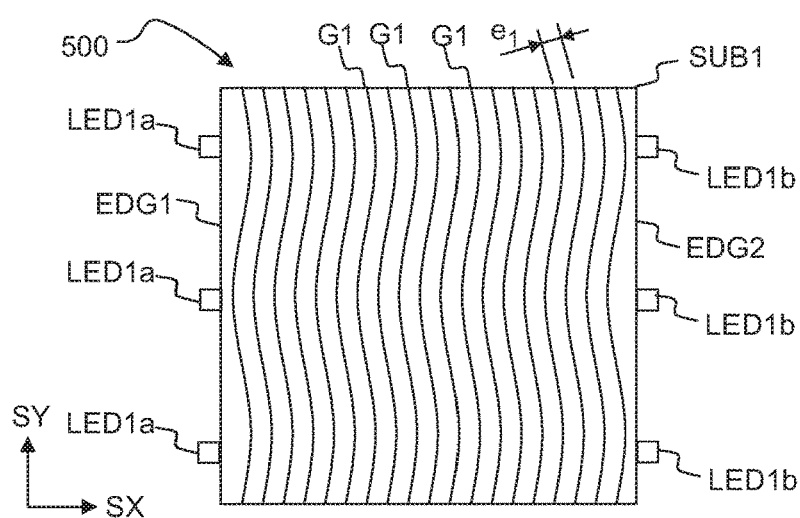
FIG. 11f shows, by way of example, in a top view, a substrate which comprises nonlinear grooves.
Figure 11G:
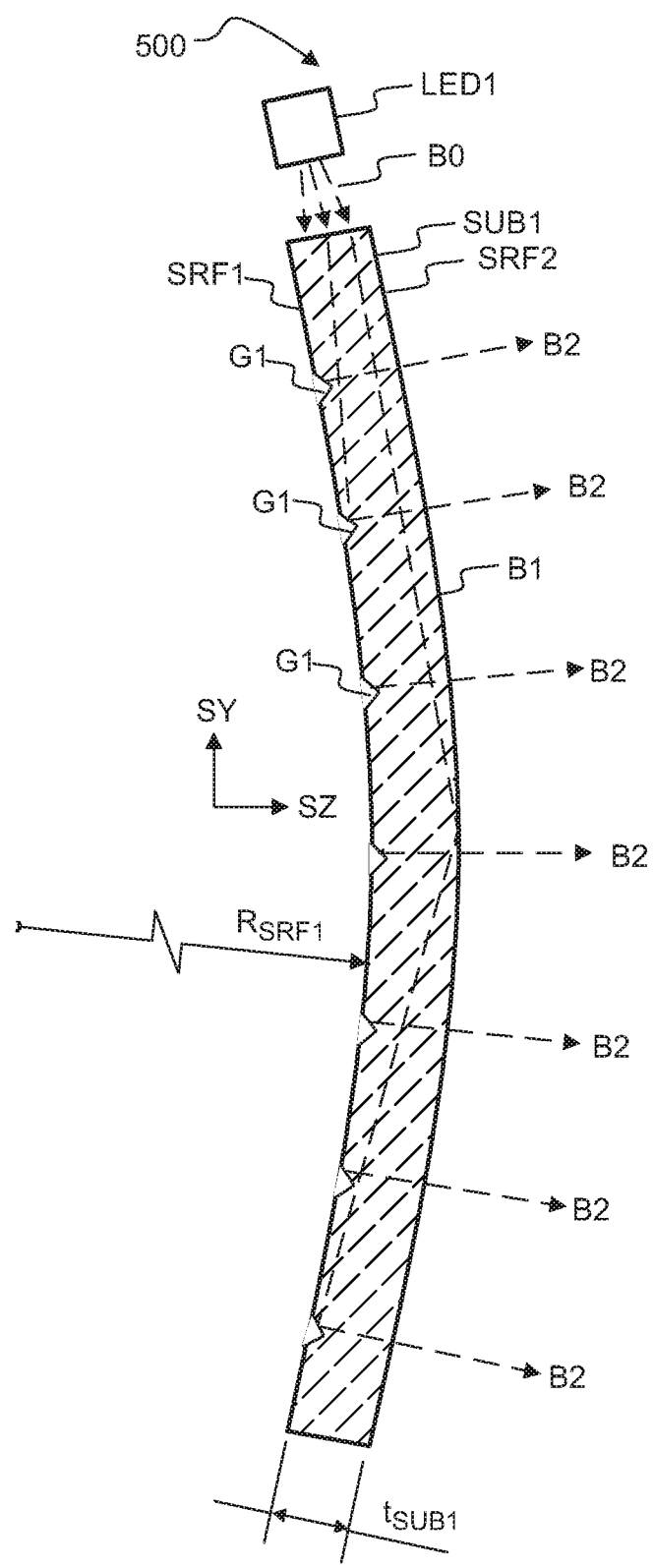
FIG. 11g shows, by way of example, in a cross-sectional side view, a curved planar waveguiding substrate.

The substrate SUB1 may be a flat planar waveguiding plate or a curved planar waveguiding plate (FIG. 11g). The substrate SUB1 may have a first major surface SRF1 and a second major surface SRF2. The second major surface SRF2 may be at least locally parallel with the first major surface SRF1. A flat planar waveguiding has a first flat major surface SRF1 and a second flat major surface SRF2. A curved planar waveguiding has a first curved major surface SRF1 and a second curved major surface SRF2. The substrate SUB1 may confine the guided light B1 by total internal reflection, which takes place on the major surfaces SRF1, SRF2. The deflected light B2a, B2b may be coupled out of the substrate SUB1 through the second major surface SRF2. The second major surface SRF2 may be arranged to operate as an output surface.

The substrate SUB1 may comprise optically transparent material. For example, the substrate SUB1 may comprise or consist of plastic, glass, silica ($SiO_2$) or sapphire ($Al_2O_3$).

The substrate SUB1 may comprise or consist of Poly (methyl methacrylate) (PMMA). The substrate SUB1 may comprise or consist of polycarbonate (PC). The substrate SUB1 may comprise or consist of polyethylene terephthalate (PET).

The light-deflecting grooves G1 may be formed e.g. by embossing, hot embossing, molding, injection molding, immolding, etching, machining, laser processing, laser engraving, mechanical engraving, chemical etching, mechanical etching, printing, nanoimprinting, ablative manufacturing and/or additive manufacturing. The devices 500 and/or the substrates SUB1 may be produced in large scale e.g. by forming the microscopic grooves G1 on a plastic substrate. The grooves G1 may be formed on the substrate e.g. in a roll-to-roll process.

An embossing tool or a mold may comprise microscopic protrusions, which may form the grooves G1 on the substrate SUB1 when pressed against the substrate SUB1. The embossing tool or the mold may be formed e.g. by photolithography, electron beam lithography, etching, chemical etching, electron beam etching, electroplating, laser engraving, mechanical engraving, machining, laser processing, electron beam, ablative manufacturing and/or additive manufacturing.

The grooves G1 may deflect light primarily by reflection and/or refraction. The grooves G1 may deflect light also by scattering. The substrate SUB1 may comprise a plurality of light-deflecting grooves G1 implemented on at least one major surface SRF1, SRF2 of the substrate SUB1.

In particular, the width $w_{G1}$ of the grooves G1 may be slightly greater than the wavelength $\lambda$ of visible light, and forming the deflected light B2 may be modeled by the Rigorous theory of scattering.

In an embodiment, the distances $e_1$ between adjacent grooves G1 may exhibit variation so as to reduce or avoid diffraction effects. The diffraction may cause a colorful rainbow effect, which may disturb vision of the observer EYE1.

Referring back to FIG. 1a, the masking device 500 may comprise first light sources LED1a for forming first guided light B1a, and second light source LED1b for forming second guided light B1b. The first guided light B1a may propagate within the substrate SUB1 in a first direction (e.g. in the direction SX). The second guided light B1b may propagate within the substrate SUB1 in a second opposite direction (e.g. in the direction −SX).

Figure 2D:
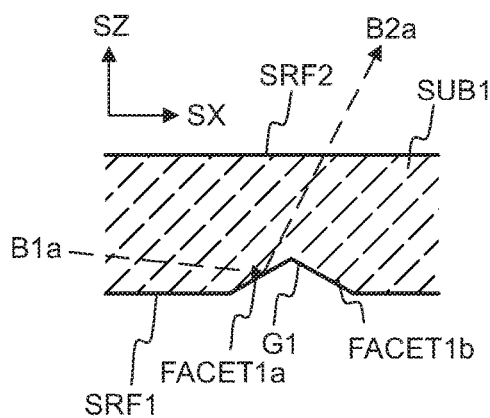
FIG. 2d shows, by way of example, in a cross-sectional side view, projecting first deflected light into a second viewing region.

Referring to FIG. 2d, the light-deflecting grooves G1 may couple the first guided light B1a out of the substrate SUB1 so as to form first deflected light B2a to the second viewing region ZONE2.

Figure 2E:
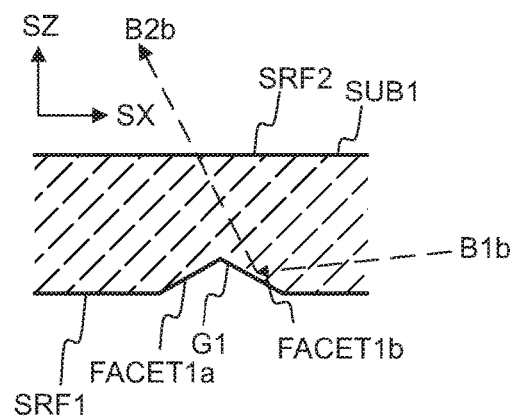
FIG. 2e shows, by way of example, in a cross-sectional side view, projecting second deflected light into a third viewing region.
Figure 2F:
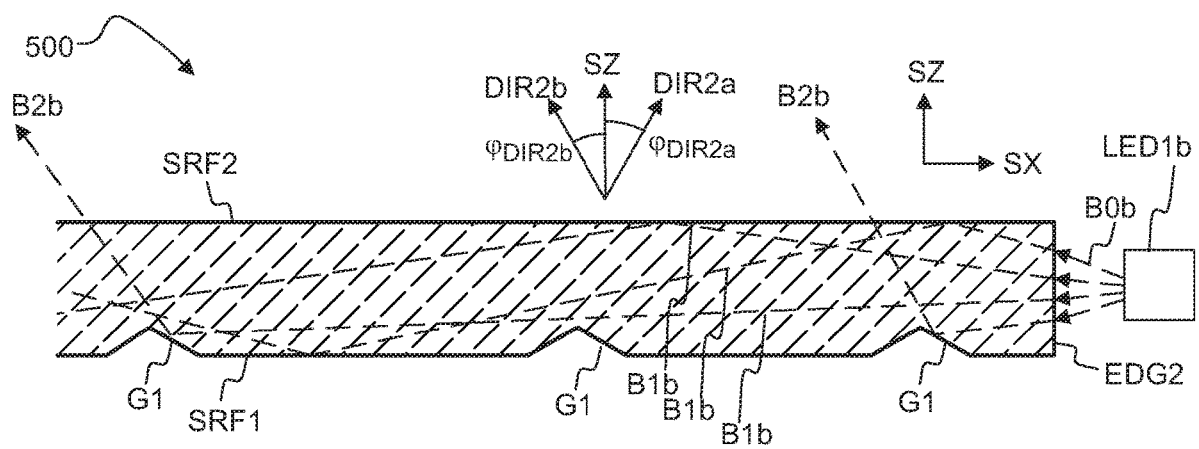
FIG. 2f shows, by way of example, in a cross-sectional side view, coupling of light into the waveguiding substrate.

Referring to FIG. 2e, the light-deflecting grooves G1 may couple the second guided light B1b out of the substrate SUB1 so as to form second deflected light B2b to a third viewing region ZONE3 (FIG. 1a).

Referring to FIG. 2f, one or more second light sources LED1b may emit second input light B0b. Second guided light B1b may be formed by coupling the second input light B0b into the substrate SUB1. The second guided light B1b may propagate in a direction (e.g. −SX), which may be opposite to the direction (SX) of propagation of the first guided light B1a. The grooves G1 may project second deflected light B2b by coupling the second guided light B2b out of the substrate SUB1.

Figure 2G:
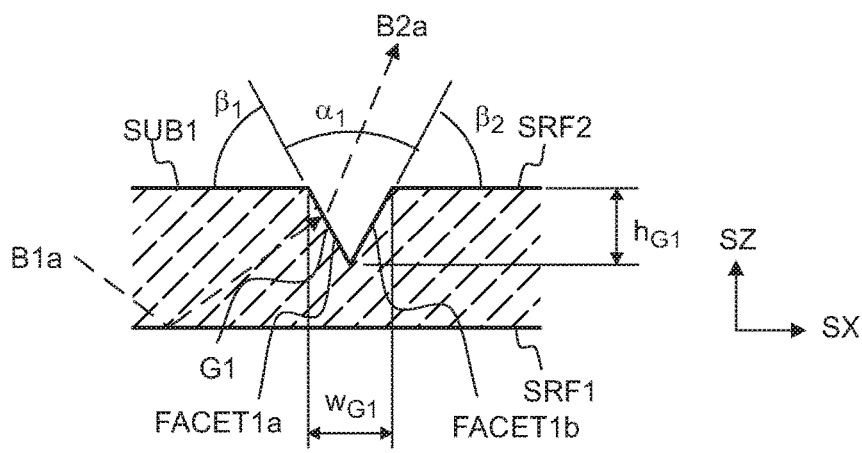
FIG. 2g shows, by way of example, in a cross-sectional side view, a light-deflecting groove which comprises refractive facets for coupling light out of the substrate.

Referring to FIG. 2g, the second major surface SRF2 may comprise a plurality of light-deflecting grooves G1, which have refractive facets FACET1a, FACET1b. A groove G1 may be arranged to couple guided light B1a out of the substrate SUB1 by refraction.

A plurality of grooves G1 may be implemented on the second major surface SRF2 to refract guided light B1a and/or B1b out of the substrate SUB1. The refractive grooves G1 may be arranged to provide an angular intensity distribution $I_{B2a}(\varphi)$ where the intensity maximum is in a direction (DIR2a), which is different from the perpendicular direction SZ. The refractive grooves G1 may be arranged to provide an angular intensity distribution $I_{B2b}(\varphi)$ where the intensity maximum is in a direction (DIR2b), which is different from the perpendicular direction SZ. The orientation angles $\beta_1$, $\beta_2$ of the refractive facets may be e.g. in the range of 40° to 70°, advantageously in the range of 50° to 60°. The apex angle $\alpha 1$ of the grooves G1 implemented on the output surface SRF2 may be e.g. in the range of 50° to 110°, advantageously in the range of 50° to 70°. Maximum intensity of the deflected light B2a may be attained when the apex angle $\alpha 1$ is e.g. in the range of 50° to 70°.

Figure 2H:
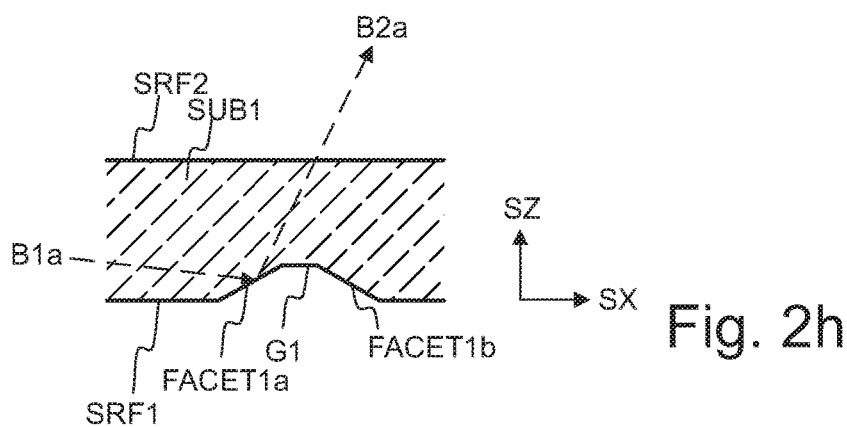
FIG. 2h shows, by way of example, in a cross-sectional side view, a light-deflecting groove, which has a trapezoidal cross section.

Referring to FIG. 2h, the cross-sectional shape of the light-deflecting grooves G1 may also be e.g. trapezoidal.

Figure 3A:
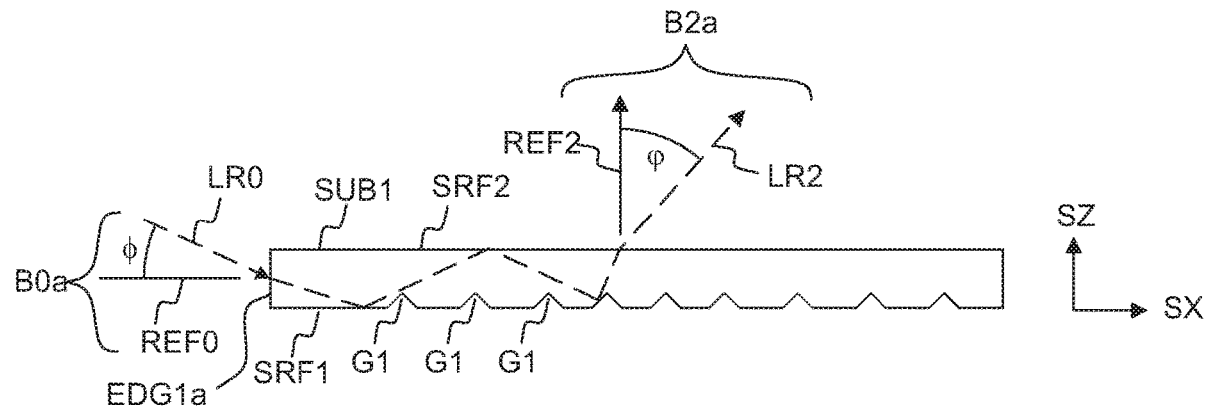
FIG. 3a shows, by way of example, in a cross-sectional side view, input angle of a light ray, and an output angle of a light ray.
Figure 3B:
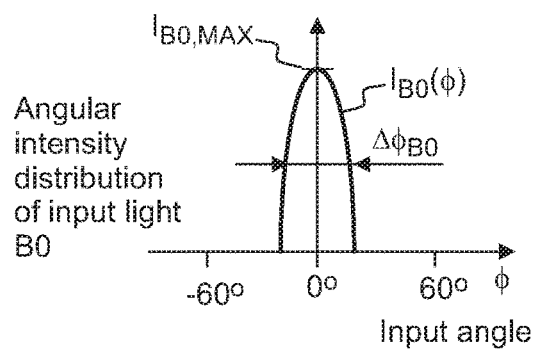
FIG. 3b shows, by way of example, angular intensity distribution of input light.
Figure 3C:
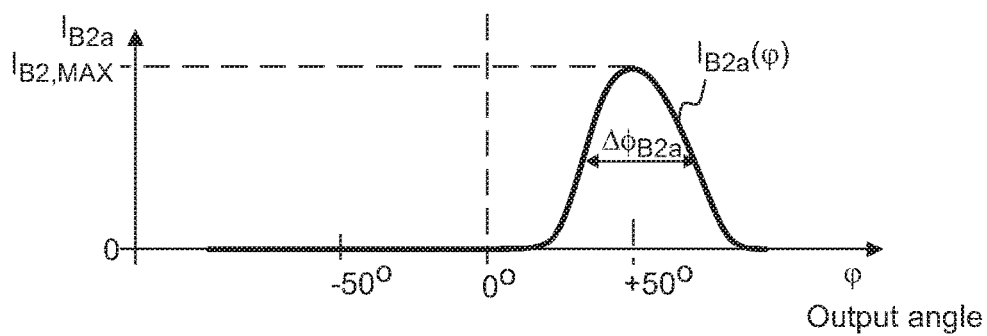
FIG. 3c shows, by way of example, angular intensity distribution of deflected output light.

Referring to FIG. 3a, a light source LED1 may provide an input light beam (B0, B0a, B0b), which may be coupled into the substrate SUB1. The guided light (B1, B1a, B1b) propagating inside the substrate SUB1 may be formed by coupling the input light (B0, B0a, B0b) into the substrate SUB1. The input light (B0, B0a, B0b) may be coupled into the substrate SUB1 e.g. through an edge (e.g. EDG1, EDG2, EDG3, EDG4) of the substrate SUB1. The light source or sources LED1 may be e.g. outside the substrate SUB1.

The light source LED1 may emit e.g. substantially white light so as to block vision of the observer EYE2 in the whole range of visible wavelengths.

The device 500 may also comprise one or more first light sources (LED1) to emit light of first color (e.g. red color), the device 500 may comprise one or more second light sources (LED1) to emit light of second color (e.g. green color), and the device 500 may comprise one or more third light sources (LED1) to emit light of third color (e.g. blue color).

The light source LED1 may be e.g. a light emitting diode. Light emitting diodes may have small size and high efficiency for converting electrical power into visible light. The light B0 emitted from light emitting diodes may be easily coupled e.g. to an edge of the substrate SUB1.

The input light beam B0 may be used as input light for the substrate SUB1. The input light B0 may have an angular intensity distribution $I_{B0}(\phi)$. The angular intensity distribution $I_{B0}(\phi)$ may have an angular width $\Delta\phi_{B0}$. The input light beam B0 may be formed of light rays LR0, which propagate in different directions ($\phi$) with different angular intensities. The input angle $\phi$ may denote an angle between the direction of propagation of a light ray LR0 and a reference plane REF0. The reference plane REF0 may be e.g. parallel with the first major surface SRF1 of the substrate SUB1. The reference plane REF0 may be perpendicular to the input edge EDG1 of the substrate SUB1.

The light-deflecting grooves G1 may form deflected light B2 by scattering guided light B1, which propagates within the substrate SUB1. The deflected output light B2 may have an angular intensity distribution $I_{B2}(\varphi)$. The angular intensity distribution $I_{B2}(\varphi)$ may have an angular width $\Delta\varphi_{B2}$.

The deflected light B2 may be formed of light rays LR2, which propagate in different directions ($\varphi$) with different angular intensities. The output angle $\varphi$ may denote an angle between the direction of propagation of a light ray LR2 and a reference plane REF2. The reference plane REF2 may be perpendicular to the first major surface SRF1 of the substrate SUB1. The reference plane REF2 may be parallel with an input edge (EDG1a) of the substrate SUB1.

The substrate SUB1 may map the angular intensity distribution $I_{B0}(\phi)$ of the input light B0 into the angular intensity distribution $I_{B2}(\varphi)$ of the deflected light B2.

Figure 4A:
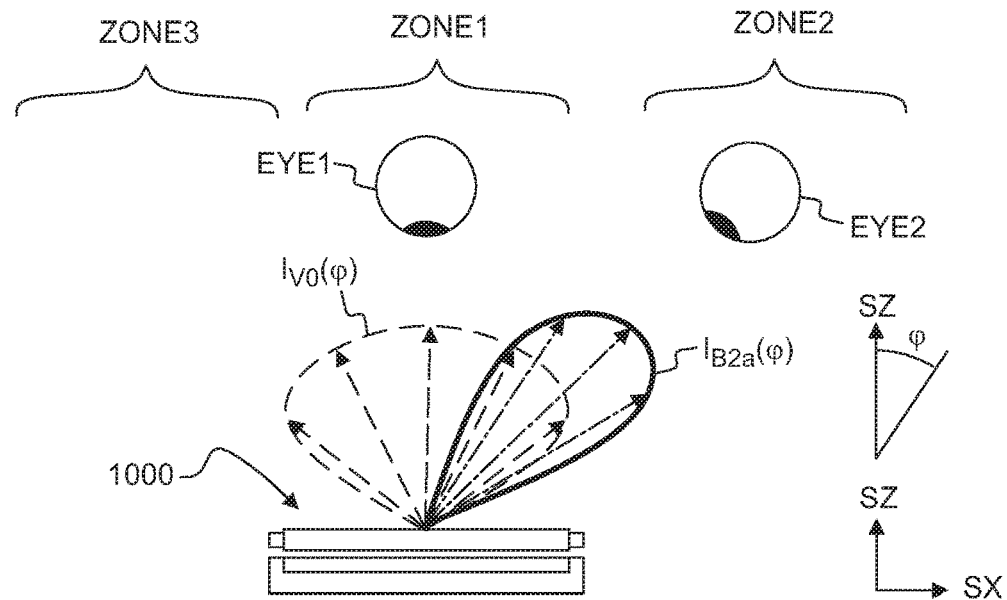
FIG. 4a shows, by way of example, angular intensity distribution of information carrying light and angular intensity distribution of deflected output light.
Figure 4B:
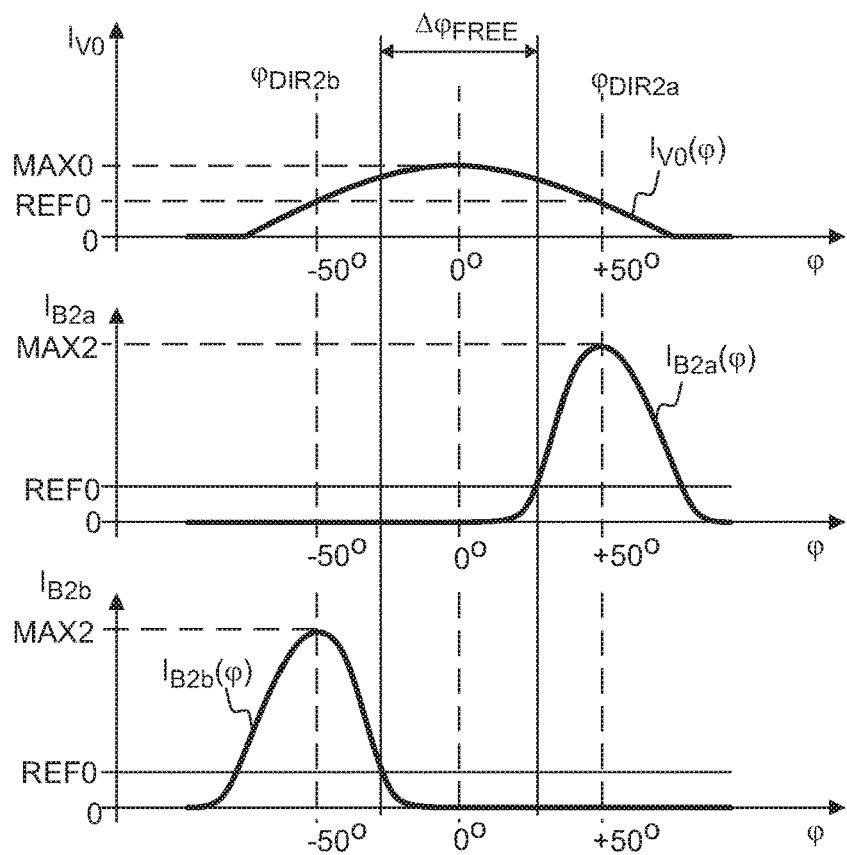
FIG. 4b shows, by way of example, angular intensity distribution of information carrying light, angular intensity distribution of first output light, and angular intensity distribution of second output light.

Referring to FIGS. 4a and 4b, the information carrying light V0 emitted from the display DISP1 may have an angular intensity distribution $I_{V0}(\varphi)$. The first deflected light B2a projected from the masking device 500 may have an angular intensity distribution $I_{B2a}(\varphi)$. The second deflected light B2b projected from the masking device 500 may have an angular intensity distribution $I_{B2b}(\varphi)$.

The masking device 500 may be arranged to project the first deflected light B2a and the second deflected light B2b such that a free angular range $\Delta\varphi_{FREE}$ remains between the peaks of the angular intensity distributions $I_{B2a}(\varphi)$, $I_{B2b}(\varphi)$.

The intensity of the deflected light B2a and B2b in the free angular range $\Delta\varphi_{FREE}$ may be lower than the maximum intensity of the information carrying light V0 in the free angular range $\Delta\varphi_{FREE}$. The intensity of the deflected light B2a and B2b at the center ($\varphi=0°$) of the free angular range $\Delta\varphi_{FREE}$ may be e.g. lower than 5% of the maximum intensity of the information carrying light V0 in the free angular range $\Delta\varphi_{FREE}$.

Figure 4C:
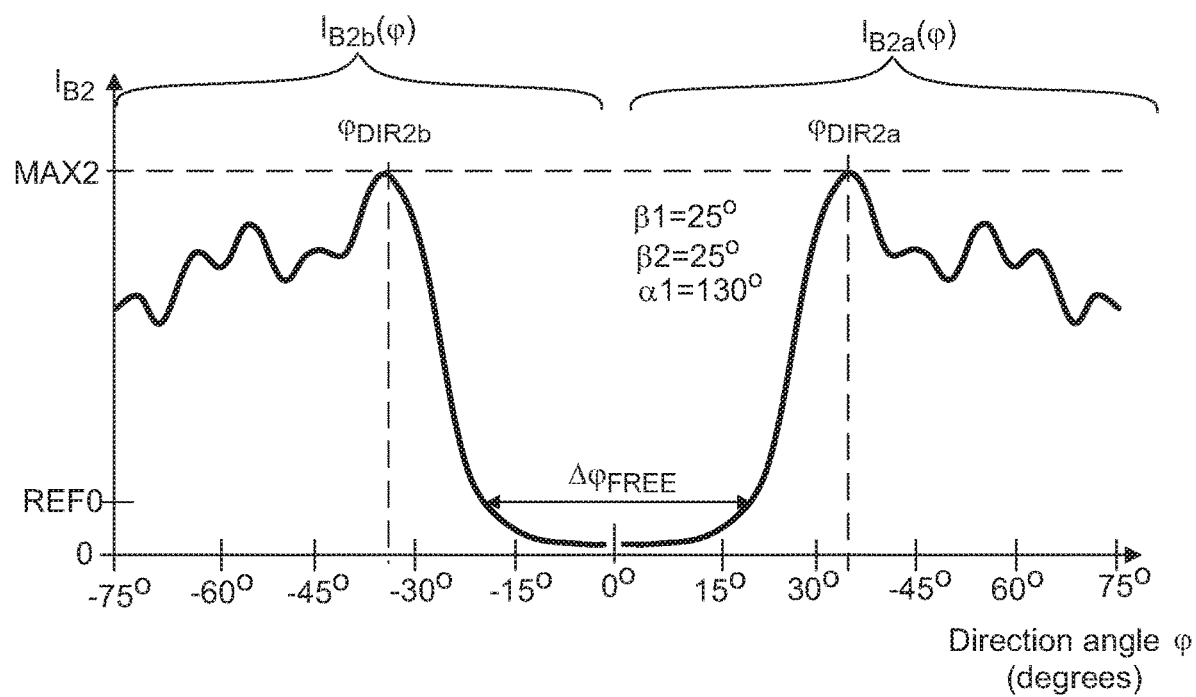
FIG. 4c shows, by way of example, angular intensity distribution of first output light, and angular intensity distribution of second output light.

FIG. 4c shows, by way of example, angular intensity distributions $I_{B2a}(\varphi)$ and $I_{B2b}(\varphi)$ in a situation where the orientation angles $\beta_1$ and $\beta_2$ of reflective facets FACET1a, FACET1b of the grooves G1 are equal to 25°, i.e. $\beta_1=\beta_2=25°$. The angular width of the free angular range $\Delta\varphi_{FREE}$ may be e.g. substantially equal to 40°.

Figure 4D:
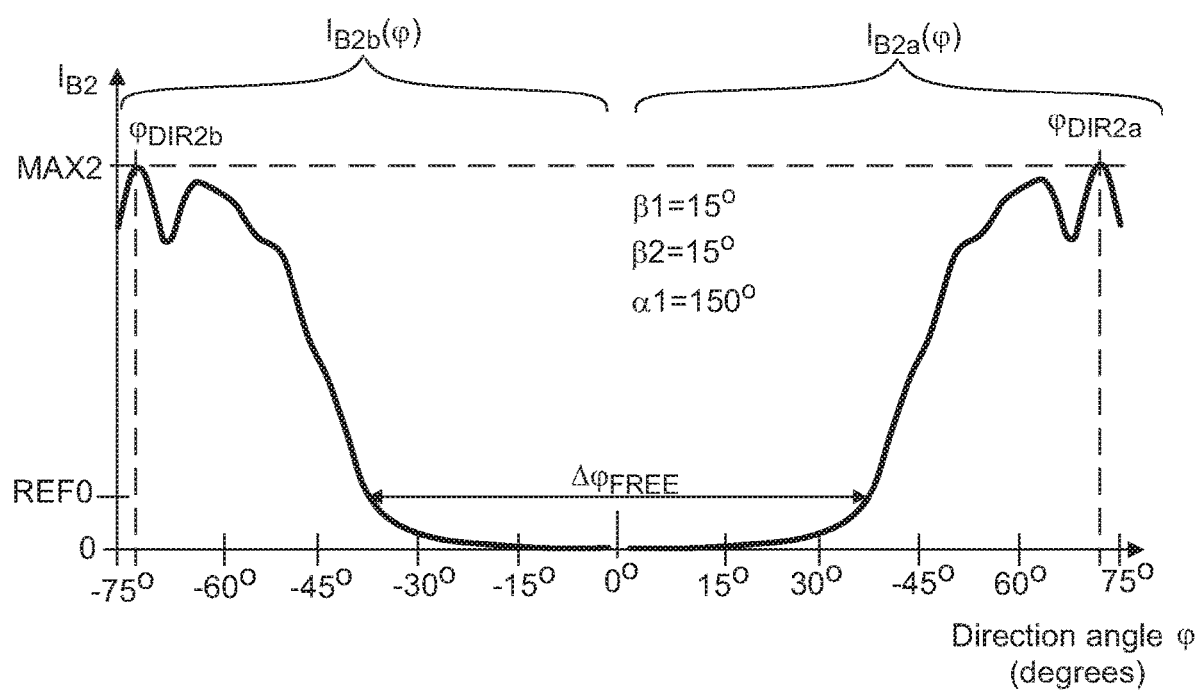
FIG. 4d shows, by way of example, angular intensity distribution of first output light, and angular intensity distribution of second output light.

FIG. 4d shows, by way of example, angular intensity distributions $I_{B2a}(\varphi)$ and $I_{B2b}(\varphi)$ in a situation where the orientation angles $\beta_1$ and $\beta_2$ of reflective facets FACET1a, FACET1b of the grooves G1 are equal to 15°, i.e. $\beta_1=\beta_2=15°$. The angular width of the free angular range $\Delta\varphi_{FREE}$ may be e.g. substantially equal to 75°.

The grooves G1 of FIG. 4d may provide a wider free angular range $\Delta\varphi_{FREE}$, when compared with the free angular range $\Delta\varphi_{FREE}$ provided by the grooves G1 of FIG. 4c.

Figure 5A:
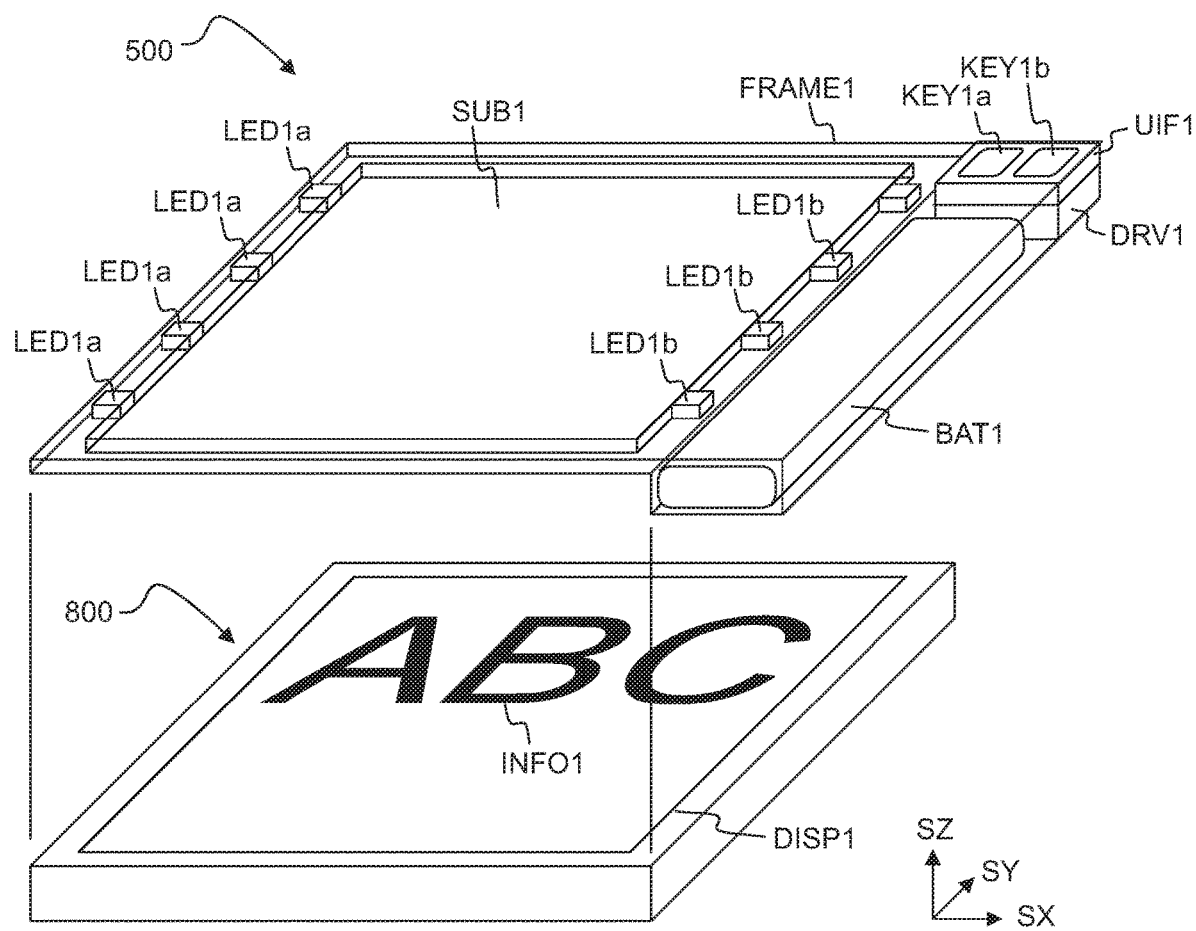
FIG. 5a shows, by way of example, in a three-dimensional view, a masking device and a display device.

Referring to FIG. 5a, the masking device 500 may comprise a frame FRAME1. The substrate SUB1 may be attached to the frame FRAME1. The light sources LED1a, LED1b may be attached to the substrate and/or to the frame FRAME1.

The frame FRAME1 may also operate as a protective housing for the light sources LED1a, LED1b.

The masking device 500 may comprise a user interface UIF1 for receiving user input for setting the operating mode (MODE1, MODE2, MODE3, MODE4) of the masking device 500. The user interface UIF1 may comprise e.g. one or more real or virtual keys KEY1a, KEY1b for receiving user input for setting the operating mode of the masking device. The operating mode of the masking device may be set e.g. by one or more electronic switches.

In an embodiment, the display device 800 may be arranged to operate as the user interface UIF1 for receiving user input for setting the operating mode of the masking device 500. The display device 800 may comprise e.g. a touch screen DISP1 for receiving user input. The substrate SUB1 of the masking device 500 may be so thin that a touch screen DISP1 may sense the proximity of a finger of a user through the masking device 500. The display device 800 may be configured to execute program code (application) to implement a user interface UIF1 for receiving user input for setting the operating mode of the masking device 500. The display device 800 may send a control signal to the masking device 500 according to the user input. The control signal may be communicated from the display device 800 to the masking device 500 e.g. by wired or wireless data communication (e.g. via WiFi, Bluetooth, or near field communication). The masking device 500 may be arranged to set the operating mode of the masking device according to the received control signal.

The masking device 500 may comprise a driver unit DRV1 to control operation of the light sources LED1a, LED1b according to the user input or according to a control signal received from the user interface UIF1. For example, the driver unit DRV1 may comprise relays, transistors or mechanical switches to connect an electric operating current to the light sources LED1a, LED1b according to the selected operating mode. The masking device 500 may optionally comprise a battery BAT1 to provide electrical operating power for the light sources LED1a, LED1b. Operating current may be conducted to the light sources LED1a, LED1b via electrical conductors (not shown).

In an embodiment, the masking device 500 may optionally comprise a power connector for receiving electrical operating power for the light sources LED1a, LED1b. The connector may comply e.g. with the USB standard (universal serial bus). In an embodiment, the masking device 500 may comprise an inductive coil for receiving electrical operating power for the light sources LED1a, LED1b from a radio frequency field generated by a wireless charger. In an embodiment, the battery BAT1 of the masking device 500 may be arranged to provide electrical operating power also for operating the display device 800.

Figure 5B:
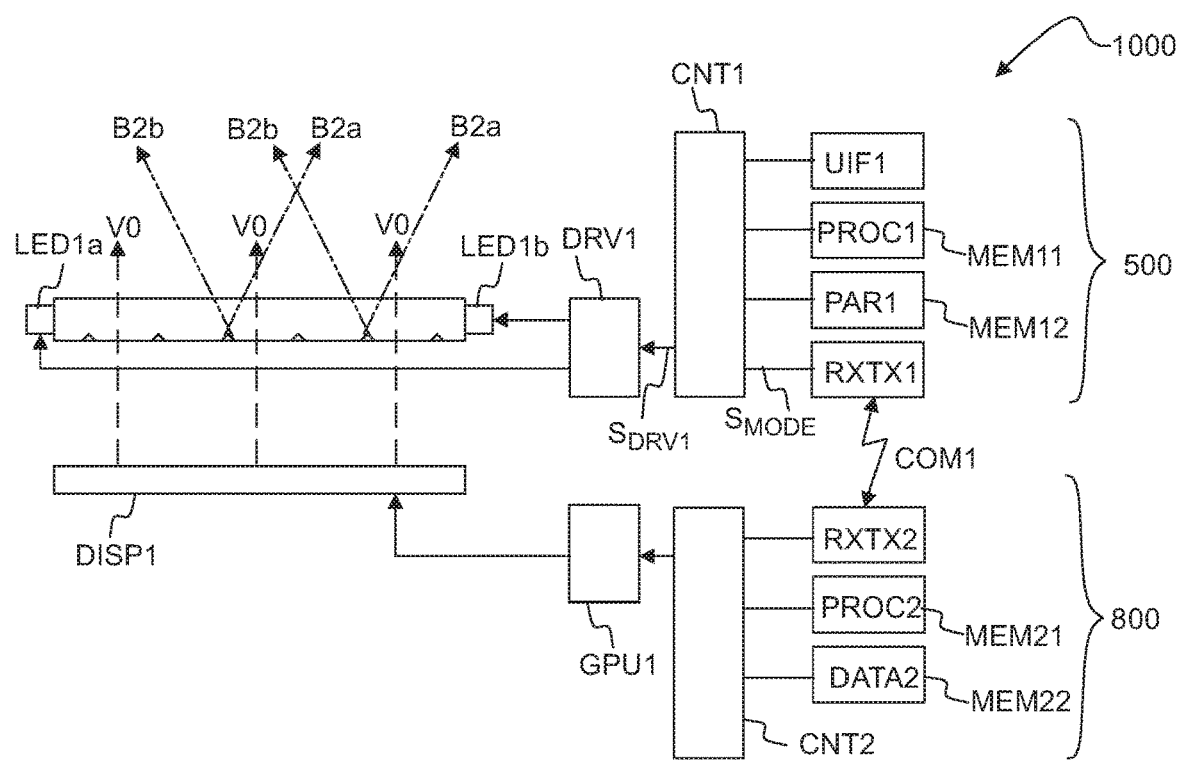
FIG. 5b shows, by way of example, functional units of a masking device and functional units of a display device.

Referring to FIG. 5b, the masking device 500 may comprise a user interface UIF1 to receive user input, a communication unit RXTX1 to receive a mode control signal $S_{MODE}$, a control unit CNT1 to provide a power control signal $S_{DRV1}$, and a driving unit DRV1 to provide operating currents for the light sources LED1a, LED1b according to the power control signal $S_{DRV1}$ provided by the control unit CNT1.

The masking device 500 may optionally comprise a memory MEM11 for storing computer program code PROC1. The masking device 500 may optionally comprise a memory MEM12 for storing operating parameter data PAR1. The control unit CNT1 may be arranged to control operation of the light sources LED1a, LED1b according to the received user input and/or according to the mode control signal $S_{MODE}$ by executing the program code PROC1. The operating parameter data PAR1 may e.g. specify operating current values for driving the light sources.

The control unit CNT1 and the driving unit DRV1 may together control and drive the light sources LED1a, LED1b. In an embodiment, the control unit CNT1 and/or the user interface UIF1 may also directly drive the light sources. The control unit CNT1 and/or the user interface UIF1 may comprise e.g. switches, relays or transistors for driving the light sources.

The display device 800 may comprise a control unit CNT2 for providing instructions to a display driver unit GPU1. The display driver unit GPU1 may drive the display DISP1 according to the instructions, for displaying information INFO1. The control unit CNT2 may form the instructions according to graphics data DATA2 by executing program code PROC2. The control unit CNT2 may comprise one or more data processors for executing program code PROC2. The display device 800 may comprise a memory MEM21 for storing computer program PROC2. The display device may optionally comprise a memory MEM22 for storing graphics data DATA2. The graphics data DATA2 may comprise e.g. a text file, a photograph, or a video file.

The display device 800 may comprise a communication unit RXTX2 for communicating the control signal $S_{MODE}$ to the masking device 500. The masking device 500 may receive the control signal $S_{MODE}$ via the communication unit RXTX1. The control signal $S_{MODE}$ may be communicated from the unit RXTX2 to the unit RXTX1 e.g. via wired or wireless communication. The control signal $S_{MODE}$ may be communicated from the unit RXTX2 to the unit RXTX1 also as an optical signal.

The masking device 500 may be arranged to operate in an operating mode indicated by the control signal $S_{MODE}$. The masking device 500 may be arranged to set the operating mode (MODE1, MODE2, MODE3, MODE4) according to the control signal $S_{MODE}$.

The control unit CNT2 of the display device 800 may be configured to form the control signal $S_{MODE}$ by executing the computer program code PROC2. Executing the program code PROC2 may cause the control unit CNT2 to form a first control signal $S_{MODE}$, which causes the masking device 500 to operate in a first operating mode (MODE1) during a first period of time, and executing the program code PROC2 may cause the control unit CNT2 to form a second control signal $S_{MODE}$, which causes the masking device 500 to operate in a second operating mode (MODE1) during a second period of time.

The control unit CNT2 may be configured to run an application by executing the computer program code PROC2. For example, the display device 800 may be a smartphone, and the application may enable using the smartphone as a user interface for receiving and sending confidential email messages. For example, the application may enable using the smartphone as a user interface for banking operations (e.g. for money transfer). The application may cause the combination of the display device 800 and the masking device 500 to start operation in a protected mode before displaying confidential information.

For example, the program code PROC2, when executed by one or more data processors CNT2, may cause the apparatus 1000 to:

display first information INFO1 on the display DISP1,
form a first mode control signal $S_{MODE}$ for setting the display device 500 to operate in a protected operating mode (e.g. MODE2 or MODE4), where projecting of first deflected light B2a is enabled during displaying the first information INFO1, display second information INFO2 on the display DISP1,
form a second mode control signal $S_{MODE}$ for setting the display device 500 to operate in a free viewing operating mode (e.g. MODE1), where projecting of first deflected light B2a is disabled during displaying the second information INFO2.

The information INFO2 may be e.g. an image, photo, video and/or text. The first information INFO1 may be e.g. a first graphical image. The second information INFO2 may be e.g. a second different graphical image.

Figure 5C:
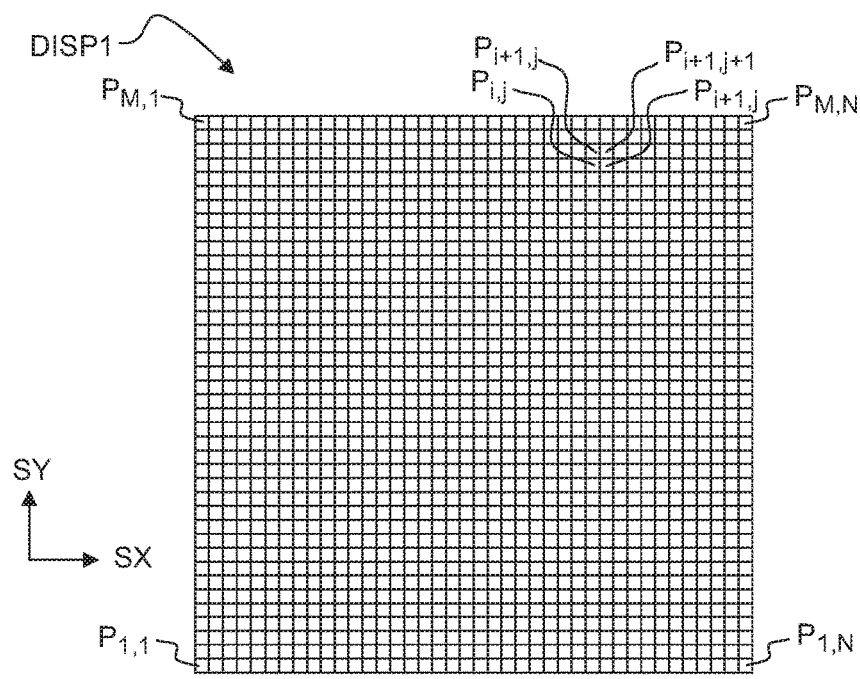
FIG. 5c shows, by way of example, pixels of a display.
Figure 6A:
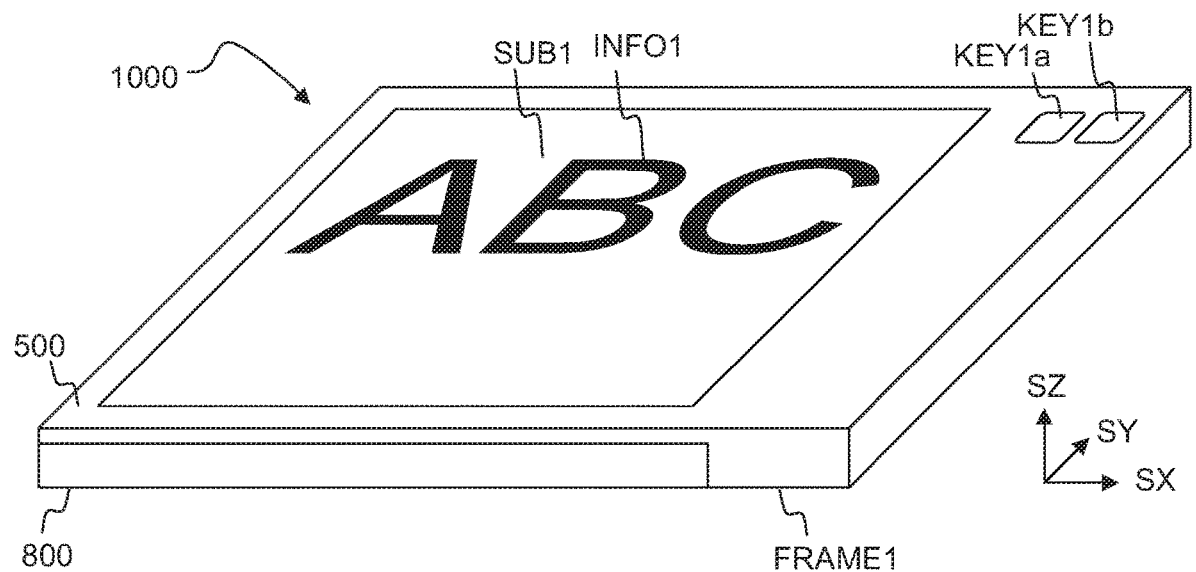
FIG. 6a shows, by way of example, in a three-dimensional view, a combination of the masking device and the display device, wherein the masking device operates in an operating mode which allows viewing information displayed on the display device.

Referring to FIG. 5c, the display DISP1 may comprise a two-dimensional array of individually controllable light-emitting pixels $P_{1,1}, \ldots P_{M,N}$. The display DISP1 may be e.g. an LCD display, Plasma, OLED, or a QD display. The display may comprise e.g. more than $10^6$ pixels. The display may provide e.g. full HD resolution with 1920×1080 pixels. The display may provide e.g. 4K resolution with 3840×2160 pixels Referring to FIG. 6a, the masking device 500 may be set to an operating mode (MODE1) where deflected light B2a is not projected to the second viewing region ZONE2. Graphical information INFO1 (e.g. the text "ABC") displayed on the display DISP1 may be visually observed by viewing from the second viewing region ZONE2.

Figure 6B:
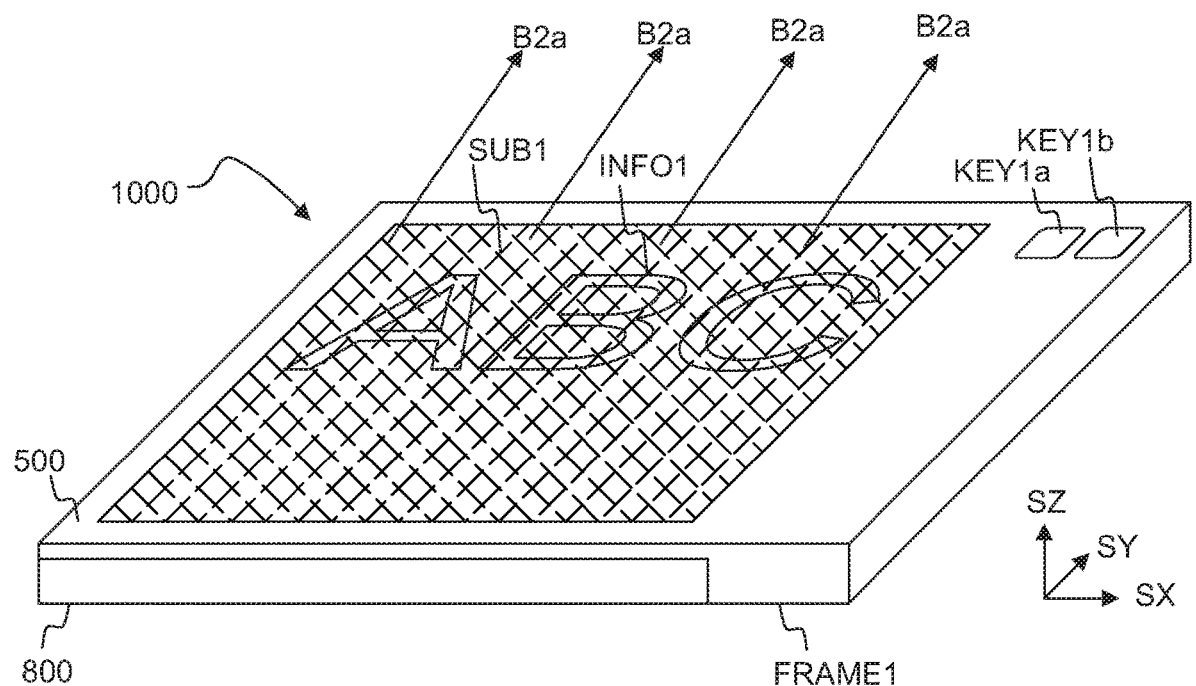
FIG. 6b shows, by way of example, in a three-dimensional view, a combination of the masking device and the display device, wherein the masking device operates in an operating mode which prevents viewing the information displayed on the display device.

Referring to FIG. 6b, the masking device 500 may be set to an operating mode (MODE2) where deflected light B2a is projected to the second viewing region ZONE2. The deflected light B2a may reduce visual edge contrast such that graphical information INFO1 (e.g. the text "ABC") displayed on the display DISP1 cannot be visually observed by viewing from the second viewing region ZONE2.

Figure 6C:
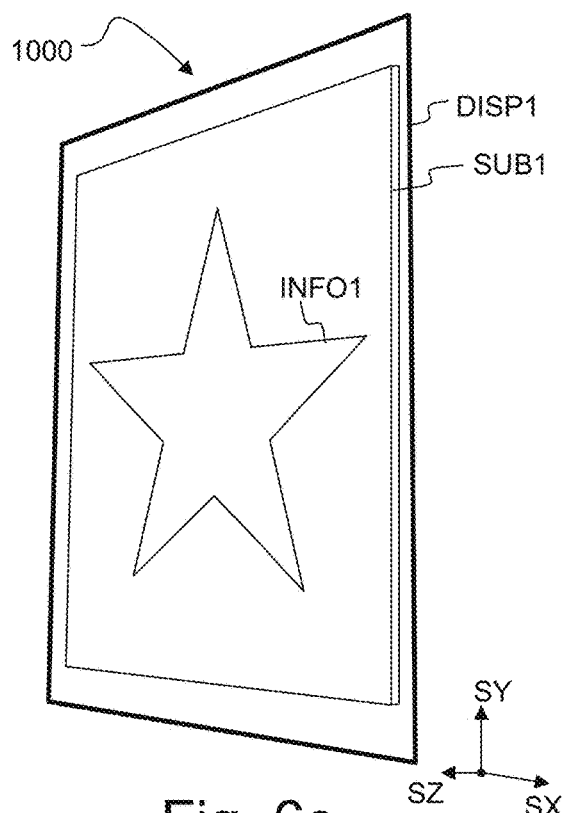
FIG. 6c shows, by way of example, in a three-dimensional view, a combination of a masking device and a display.

Referring to FIG. 6c, the substrate SUB1 of the visibility control device 500 may be positioned on top of the display DISP1, for controlling visibility of graphical information INFO1 displayed on the display DISP1.

The display DISP1 may be e.g. the display of a smartphone, a display of a tablet, a display of a portable computer, a vehicle panel display, a display of a check-in terminal, or a display of an on-line banking terminal. The display DISP1 and the visibility control device 500 may be used as a combination. The visibility control device 500 may be arranged to protect privacy of confidential information INFO1 displayed on the display DISP1.

Figure 6D:
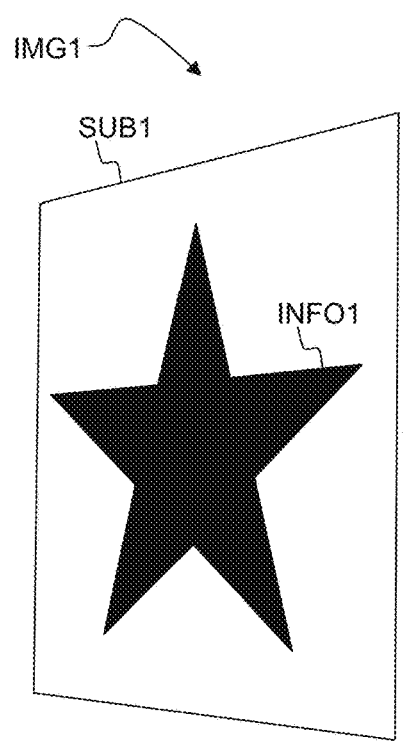
FIG. 6d shows, by way of example, in a three-dimensional view, visual appearance of the combination of FIG. 6c when projecting of deflected light is disabled.

FIG. 6d is an annotated photograph (IMG1), which shows visual appearance of the combination of the masking device 500 and the display DISP1 in a situation where the device 500 does not project deflected light B2a towards a viewer located in a second viewing region ZONE2. In this situation, the viewer EYE2 located in a second viewing region ZONE2 may observe the information INFO1 displayed on the display DISP1.

Figure 6E:
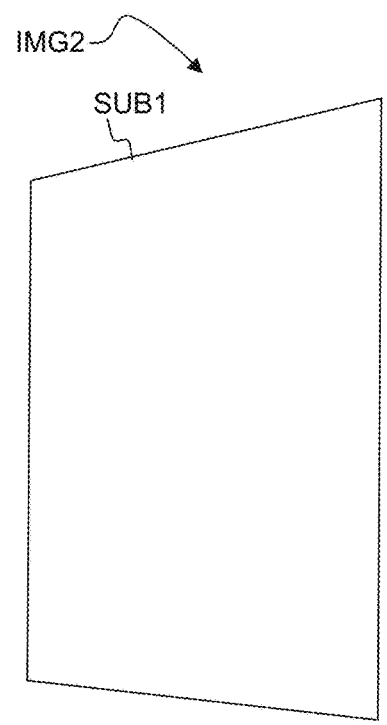
FIG. 6e shows, by way of example, in a three-dimensional view, visual appearance of the combination of FIG. 6c when projecting of deflected light is enabled.

FIG. 6e is an annotated photograph (IMG2), which shows visual appearance of the combination of the marking device 500 and the display DISP1 in a situation where the device 500 projects deflected light B2a towards the viewer EYE2 located in a second viewing region ZONE2. In this situation, the viewer EYE2 located in the second viewing region ZONE2 cannot observe the information INFO1 displayed on the display DISP1 due to the projected deflected light B2a.

Figure 7A:
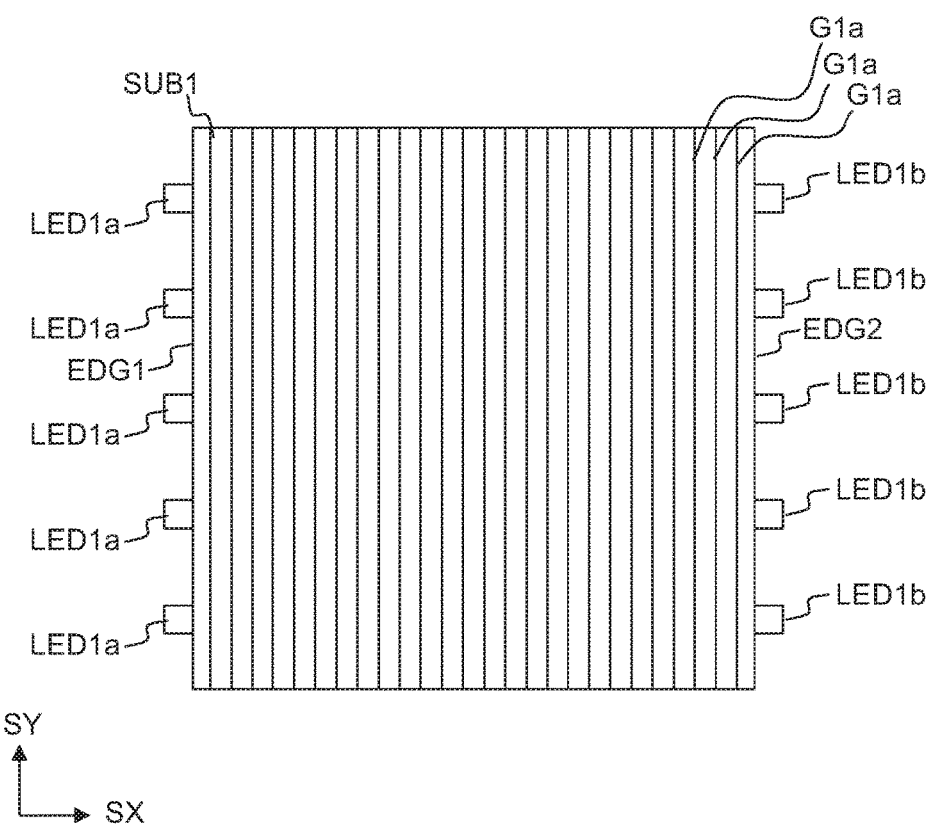
FIG. 7a shows, by way of example, in a top view, a masking device for providing first deflected light and second deflected light.

Referring to FIG. 7a, the masking device 500 may comprise first light sources LED1a for projecting first deflected light B2a to a second viewing region ZONE2. The masking device 500 may comprise second light sources LED1b for projecting second deflected light B2b to a third viewing region ZONE3. The first light sources LED1a may be disposed at a first edge EDG1 of the substrate SUB1, and the second light sources LED1b may be disposed at a second (opposite) edge EDG2 of the substrate SUB1. The masking device 500 may be arranged to form first guided light B1a by coupling light of the first light sources LED1a into the substrate SUB1. The masking device 500 may be arranged to form second guided light B1b by coupling light of the second light sources LED1b into the substrate SUB1. The first guided light B1a may propagate e.g. in the direction SX. The second guided light B1b may propagate e.g. in the direction −SX. The direction of propagation of the second guided light B1b may be opposite to the direction of propagation of the first guided light B1a. The substrate SUB1 may comprise a plurality of light-deflecting grooves G1a. The light-deflecting grooves G1a may form the first deflected light B2a by coupling the first guided light B1a out of the substrate SUB1. The light-deflecting grooves G1a may form the second deflected light B2b by coupling the second guided light B1b out of the substrate SUB1.

Projecting the first deflected light B2a may be enabled and disabled by switching the first light sources LED1a on and off. Projecting the second deflected light B2b may be enabled and disabled by switching the second light sources LED1b on and off.

Figure 7B:
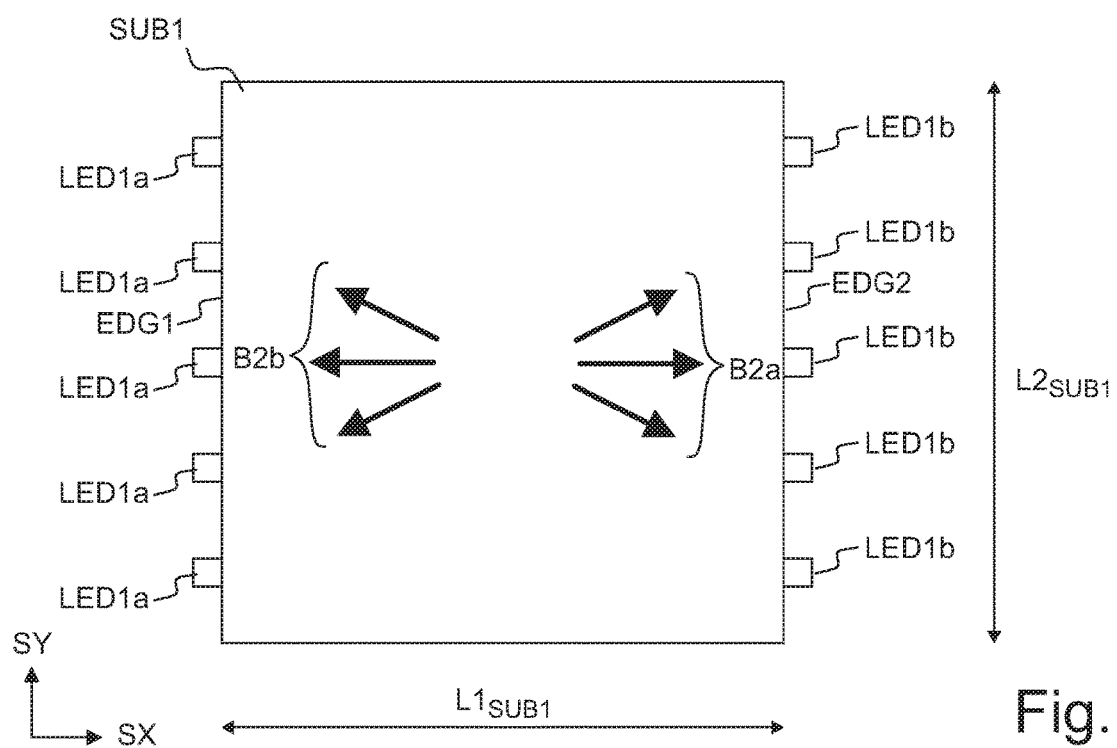
FIG. 7b shows, by way of example, in a top view, projecting first deflected light to a first azimuth range, and projecting second deflected light to a second azimuth range.
Figure 8A:
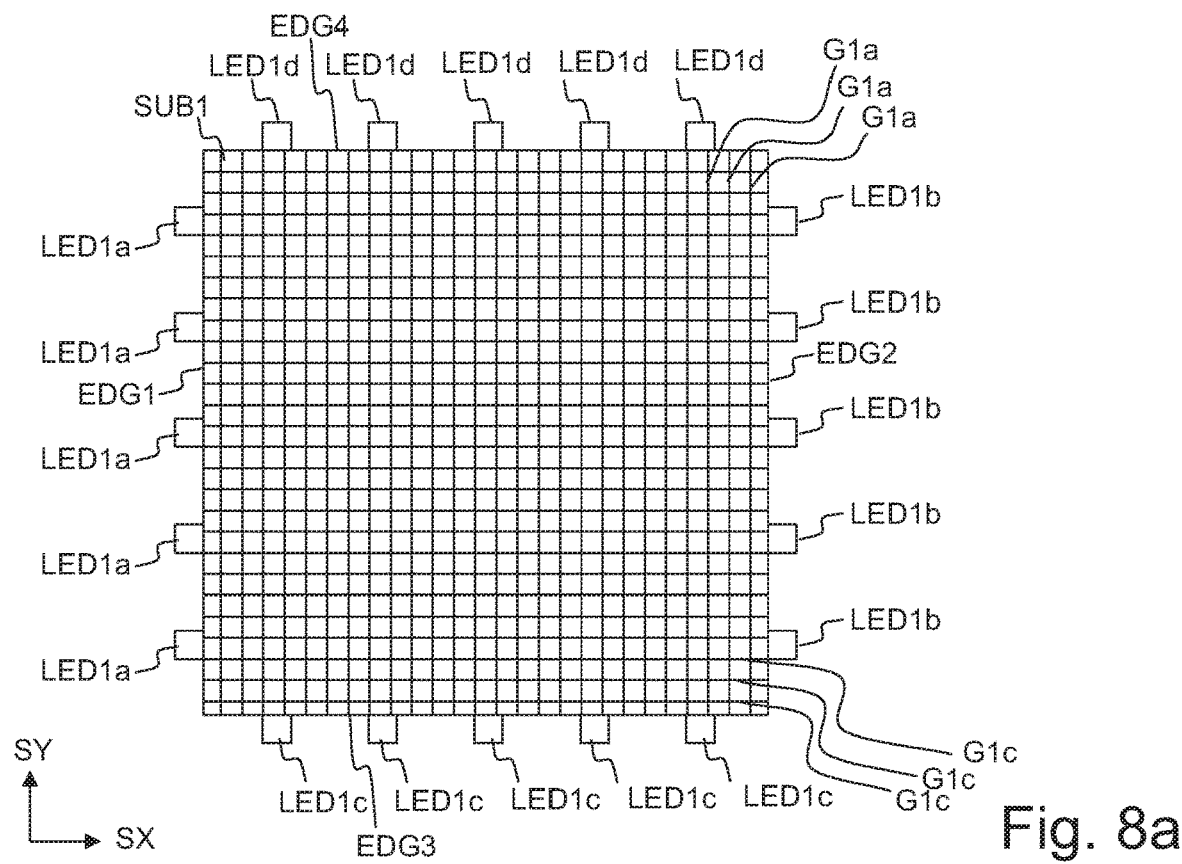
FIG. 8a shows, by way of example, in a top view, a masking device for providing first deflected light, second deflected light, third deflected light, and fourth deflected light.
Figure 8B:
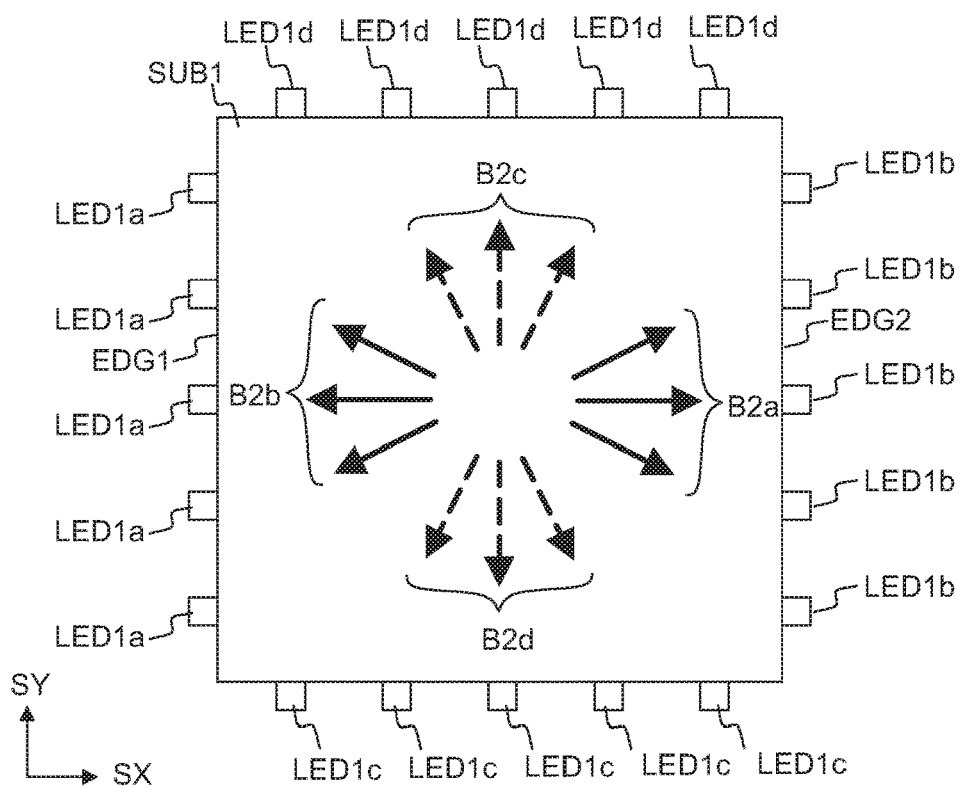
FIG. 8b shows, by way of example, in a top view, projecting first deflected light to a first azimuth range, projecting second deflected light to a second azimuth range, projecting third deflected light to a third azimuth range, and projecting fourth deflected light to a fourth azimuth range.
Figure 8C:
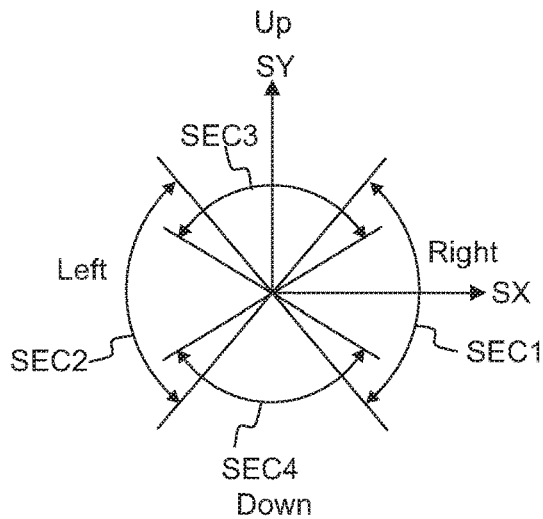
FIG. 8c shows, by way of example, the first azimuth range, the second azimuth range, the third azimuth range, and the fourth azimuth range.

Referring to FIGS. 7b and 8c, the first deflected light B2a may be projected to a first azimuth range SEC1. The azimuth range may also be called e.g. as a sector. The directions of propagation of the first deflected light B2a may be within a first range SEC1 of azimuth angles. The second deflected light B2b may be projected to a second azimuth range SEC2.

Referring to FIGS. 8a to 8c, the masking device 500 may comprise third light sources LED1c for projecting third deflected light B2c to a fourth viewing region ZONE4. The masking device 500 may comprise fourth light sources LED1d for projecting fourth deflected light B2d to a fifth viewing region ZONE5. The third light sources LED1c may be disposed at a third edge EDG3 of the substrate SUB1, and the fourth light sources LED1d may be disposed at a fourth (opposite) edge EDG4 of the substrate SUB1. The masking device 500 may be arranged to form third guided light B1c by coupling light of the third light sources LED1c into the substrate SUB1. The masking device 500 may be arranged to form fourth guided light B1d by coupling light of the fourth light sources LED1d into the substrate SUB1. The third guided light B1c may propagate e.g. in the direction SY. The fourth guided light B1d may propagate e.g. in the direction −SY. The direction of propagation of the fourth guided light B1d may be opposite to the direction of propagation of the third guided light B1c. The direction of propagation of the third guided light B1c may be perpendicular to the direction of propagation of the first guided light B1a. The substrate SUB1 may comprise a plurality of light-deflecting grooves G1c. The light-deflecting grooves G1c may form the third deflected light B2c by coupling the third guided light B1c out of the substrate SUB1. The light-deflecting grooves G1c may form the fourth deflected light B2d by coupling the fourth guided light B1d out of the substrate SUB1.

Projecting the third deflected light B2c may be enabled and disabled by switching the third light sources LED1c on and off. Projecting the fourth deflected light B2d may be enabled and disabled by switching the fourth light sources LED1d on and off.

Referring to FIG. 8c, the third deflected light B2c may be projected to third azimuth range SEC3. The fourth deflected light B2d may be projected to a fourth azimuth range SEC4. The azimuth range SEC3 may overlap the range SEC1 and/or the azimuth range SEC3 may overlap the range SEC2. The azimuth range SEC4 may overlap the range SEC1 and/or the azimuth range SEC4 may overlap the range SEC2.

Figure 9:
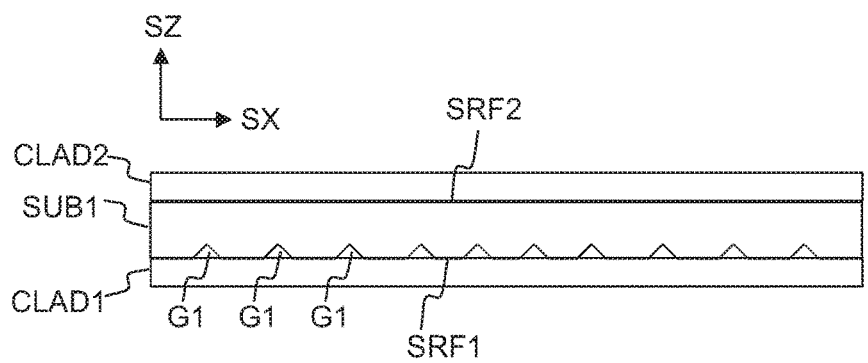
FIG. 9 shows, by way of example, in a cross-sectional side view, a masking device, which comprises a first cladding layer to provide total internal reflection on the first major surface of the waveguiding substrate, and which comprises a second cladding layer to provide total internal reflection on the second major surface of the waveguiding substrate.

Referring to FIG. 9, the masking device 500 may comprise one or more cladding layers CLAD1, CLAD2 to ensure total internal reflection at the first major surface SRF1 and/or at the second major surface SRF2 of the substrate SUB1. The substrate SUB1 may be stacked between the cladding layers CLAD1, CLAD2. A first cladding layer CLAD1 may be in contact with the first major surface SRF1 of the substrate SUB1. A second cladding layer CLAD2 may be in contact with the second major surface SRF2 of the substrate SUB1. The substrate SUB1 may have a reflective index $n_{SUB1}$. The first cladding layer CLAD1 may have a refractive index $n_{CLAD1}$. The second cladding layer CLAD2 may have a refractive index $n_{CLAD2}$. The refractive index $n_{SUB1}$ may be higher than the refractive indices $n_{CLAD1}$, $n_{CLAD2}$ in order to provide the total internal reflection at the surfaces SRF1, SRF2. The cladding layer CLAD1 and/or CLAD2 may comprise e.g. transparent plastic or transparent adhesive to provide a refractive index ($n_{CLAD1}$, $n_{CLAD2}$), which is lower than the refractive index $n_{SUB1}$ of the substrate SUB1. The cladding layers CLAD1, CLAD2 may also mechanically protect the surfaces SRF1, SRF2.

Figure 10:
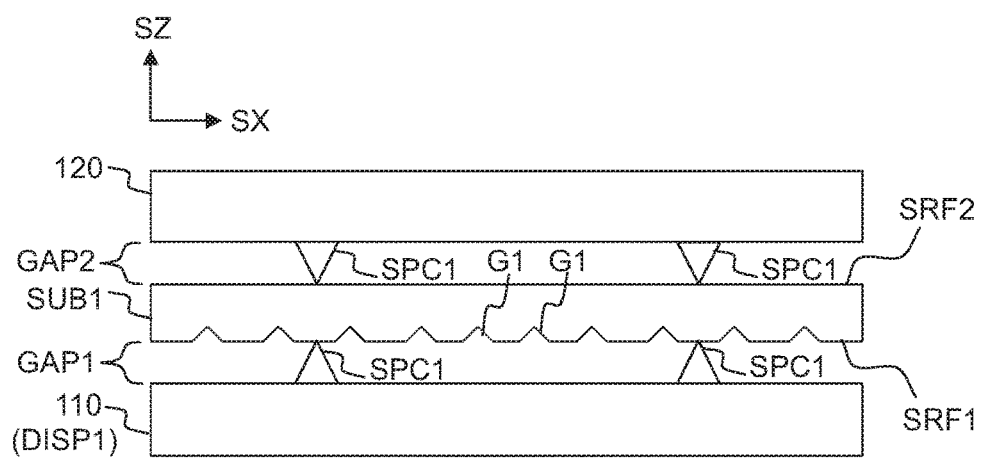
FIG. 10 shows, by way of example, in a cross-sectional side view, a masking device, which comprises spacer elements to maintain an air gap.

Referring to FIG. 10, the major surface SRF1 and/or SRF2 may be arranged to operate as a gas-solid interface, in order to provide total internal reflection (TIR). For example, the surfaces SRF1, SRF2 may be in contact with air, nitrogen or argon. Total internal reflection at the gas-solid interface may be substantially lossless, i.e. optical power is not absorbed at the reflection point. The gas-solid interface may provide a low-cost solution for providing a substrate SUB1, which has a large area.

The visibility control device 500 may comprise transparent protective layers 110, 120 e.g. to mechanically protect the surfaces SRF1, SRF2. Any scratches or dust particles deposited on the surfaces SRF1, SRF2 may be easily visible, due to the high intensity of the guided light B1 propagating within the substrate SUB1. The protective layers 110, 120 may be e.g. transparent glass plates or plastic plates. The device 500 may comprise a plurality of (narrow) spacer elements SPC1 to define a gap GAP1, GAP2 between the substrate SUB1 and the protective layers 110, 120. The gaps GAP1, GAP2 may allow more freedom to select the material of the transparent protective layers 110, 120. The transparent protective layers 110, 120 may have any refractive index.

The display DISP1 may operate as the layer 110. The spacers SPC1 may define a gap between the substrate SUB1 and the display DISP1.

Referring to FIG. 11a, illuminating input light (B0, B0a, B0b) obtained from a light source (LED1, LED1a, LED1b) may be coupled into the substrate SUB1 e.g. through an edge (EDG1, EDG1a, EDG1b, EDG2) of the substrate SUB1. The edge may operate as an in-coupling structure INC1.

The device 500 may optionally comprise e.g. focusing optics to focus input light B0 to the edge EDG1. The device 500 may comprise refractive and/or reflective focusing optics. For example, the device 500 may comprise an elliptical reflector to focus input light B0 from a linear cold cathode fluorescent lamp to an edge of the substrate SUB1.

Coupling of light B0 into the edge EDG1 may be difficult in a situation where the thickness $t_{SUB1}$ of the substrate SUB1 is small when compared with the smallest dimension of the light emitter (LED1).

Referring to FIG. 11b, the input light B0 may also be coupled into the substrate SUB1 via the major surface SRF1 and/or SRF2, by using an in-coupling element INC1. The in-coupling element INC1 may comprise e.g. one or more grooves G2, which are arranged to form guided light B1 by reflecting input light B0 received from a light source LED1.

Referring to FIG. 11c, the input light B0 may also be coupled into the substrate SUB1 by using an in-coupling prism PRISM1. The in-coupling prism PRISM1 may comprise an input facet FACE00 to form the guided light B1 by coupling the input light B0 into the prism PRISM1. The prism PRISM1 may comprise a second coupling facet FACE01 to couple the guided light B1 from the prism PRISM1 to the substrate SUB1 through the major surface SRF1 or SRF2. The coupling facet FACE01 may be in contact with the major surface SRF1 or SRF2.

The in-coupling arrangement of FIG. 11b or 11c may be used e.g. in a situation where the light emitter (LED1) is large when compared with the thickness $t_{SUB1}$ of the substrate SUB1.

Referring to FIG. 11d, the substrate SUB1 may also comprise grooves G1, which are shorter than the lateral dimensions ($L1_{SUB1}$, $L2_{SUB1}$) of the substrate SUB1. The grooves G1 do not need to continuously extend from one edge of the substrate to another edge of the substrate. The length $L_{G1}$ of each groove G1 may be e.g. greater than 5 times the width $w_{G1}$ of said groove G1.

The lengths $L_{G1}$ of the grooves G1, the depths $h_{G1}$ of the grooves G1 and/or the positions (x,y) of the grooves G1 may be selected to provide a desired spatial intensity distribution $I_{B2a}(x,y)$. In particular, the lengths $L_{G1}$ of the grooves G1, the depths $h_{G1}$ of the grooves G1 and/or the positions (x,y) of the grooves G1 may be selected to provide a substantially even spatial intensity distribution $I_{B2a}(x,y)$. x denotes a position coordinate in the direction SX. y denotes a position coordinate in the direction SY.

Referring to FIG. 11e, the substrate SUB1 may comprise a plurality of grooves G1 which have different orientations. The substrate SUB1 may comprise a plurality of grooves G1 which have a first orientation and a plurality of grooves G1 which have a second different orientation. The orientations of the grooves G1 may be selected e.g. in order to provide a desired angular intensity distribution $I_{B2a}(\varphi)$.

Referring to FIG. 11f, the substrate SUB1 may comprise a plurality of curved grooves G1.

Referring to FIG. 11g, the planar waveguiding substrate may also be curved. The radius $R_{SRF1}$ of curvature of the first major surface SRF1 of the substrate SUB1 may be e.g. greater than 50 times the thickness $t_{SUB1}$ of the substrate SUB1. The major surfaces SRF1, SRF2 of a curved planar waveguide SUB1 may be singly curved, i.e. they may be e.g. cylindrical surfaces. The major surfaces SRF1, SRF2 of a curved planar waveguide SUB1 may be doubly curved, i.e. they may be e.g. spherical surfaces.

In an embodiment, a masking device 500 which comprises a curved planar waveguiding substrate SUB1 may be used together with a curved display DISP1.

In an embodiment, a masking device 500 which comprises a curved planar waveguiding substrate SUB1 may be used with a flat display DISP1. For example, the substrate SUB1 may be used as a luminous dome over the display DISP1. The dome may also provide mechanical protection in addition to providing the privacy.

In an embodiment, the curved planar waveguiding substrate SUB1 may be formed by forming a plurality of grooves G1 on a flat substrate, and converting the flat substrate into the curved substrate after the grooves have been formed.

Referring to FIGS. 12a and 12b, the substrate SUB1 may comprise a first out-coupling region REG1 and a second region REG2, which does not couple guided light out of the substrate SUB1. The substrate SUB1 may optionally comprise one or more feature-free portions REG2, which do not comprise light-deflecting grooves G1. The feature-free portion REG2 may allow viewing (second) displayed information INFO2 (e.g. the text "DEF") in all operating modes of the masking device 500. The device of FIG. 12a or FIG. 12b may have at least one operating mode where projected deflected light B2a prevents visually observing the first information INFO1, when viewed from the second viewing region ZONE2. The first region REG1 may have dimensions $L1_{REG2}$, $L2_{REG2}$. The second region REG2 may have dimensions $L1_{REG2}$, $L2_{REG2}$.

Referring to FIG. 12c, the substrate SUB1 may comprise an out-coupling region REG1, which comprises a plurality of grooves G1 to couple guided light out of the substrate SUB1. The out-coupling region REG1 may be covered with a pattern of grooves G1. The entire area of the out-coupling region REG1 may be patterned with the grooves G1 such that the grooves G1 cover e.g. less than 5% of the area of the out-coupling region REG1. However, the entire area of the substrate SUB1 does not need to be patterned with the grooves G1. The area of the out-coupling region REG1 may be smaller than or equal to the area of the major surface SRF1, SRF2. The dimension $L1_{REG1}$ of the out-coupling region REG1 in the direction SX may be equal to or smaller than the corresponding dimension $L1_{SUB1}$ of the substrate SUB1, and/or the dimension $L2_{REG1}$ of the out-coupling region REG1 in the direction SY may be equal to or smaller than the corresponding dimension $L2_{SUB1}$ of the substrate SUB1. The substrate SUB1 may also comprise an outer region REG0, which is not arranged to couple light out of the substrate. The outer region REG0 may be optionally covered e.g. with a frame (FIG. 5a) and/or with an opaque covering layer.

Figure 12D:
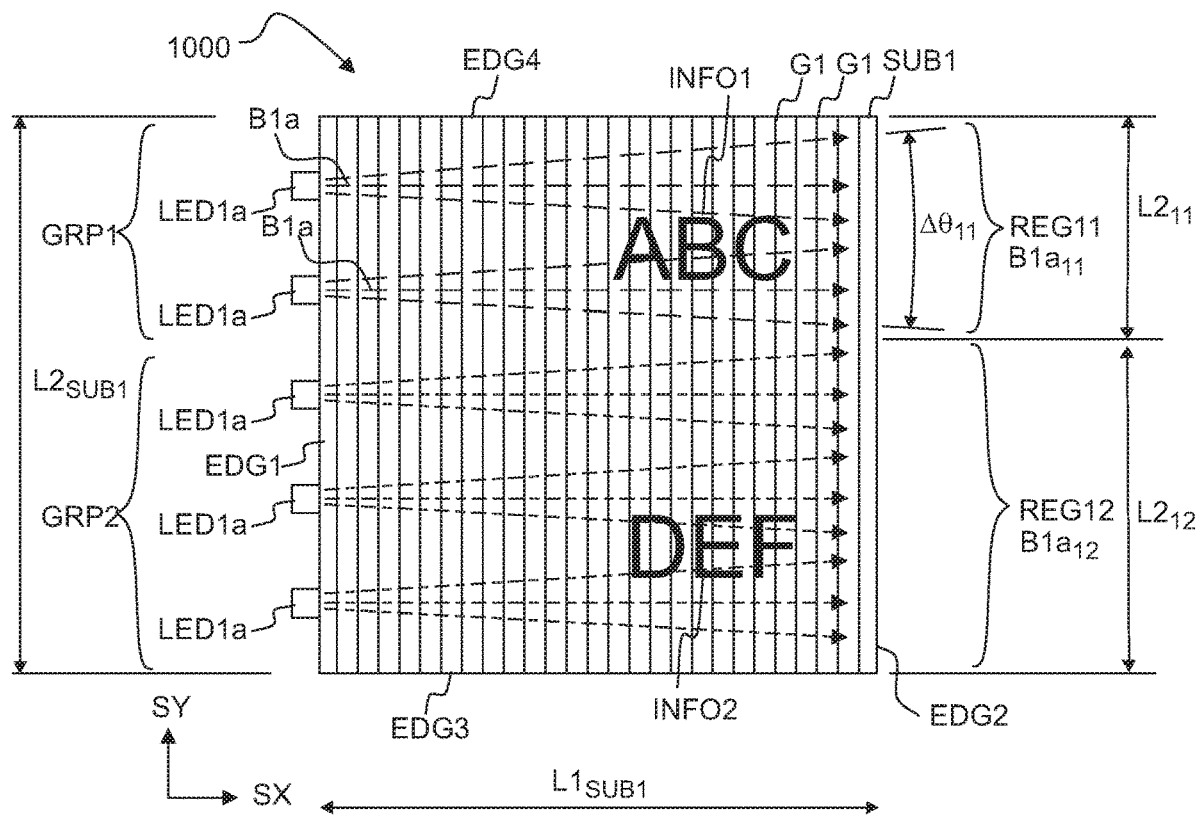
FIG. 12d shows by way of example, in a top view, a first group of light sources at a first edge, and a second group of light sources at the same first edge.
Figure 12E:
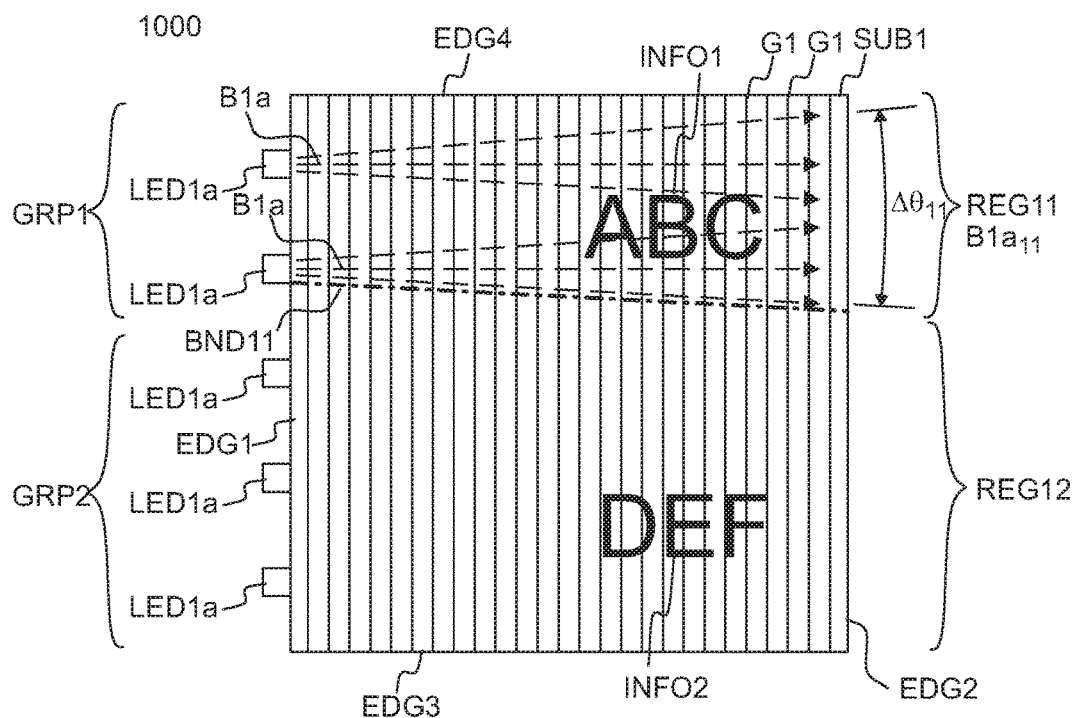
FIG. 12e shows by way of example, in a top view, a situation where operation of the light sources of the first group is enabled and the operation of the light sources of the second group is disabled.

Referring to FIGS. 12d and 12e, input light B0a emitted from several light sources LED1a may be coupled into the substrate SUB1 through the same edge EDG1 of the substrate SUB1. The first light sources LED1a may be partitioned into a first group GRP1 and a second group GRP2. The first light sources LED1a of the first group GRP1 and the second group GRP2 may be positioned at the same edge EDG1. The first group GRP1 may comprise one or more light sources LED1a. The first group GRP1 may also be called as a first subset of the light sources LED1a. The second group GRP2 may comprise one or more light sources LED1a. The second group GRP2 may also be called as a second subset of the light sources LED1a.

The device 500 may comprise a first subset GRP1 of first light sources LED1a positioned at a first edge EDG1 of the substrate SUB1 and a second independently controllable subset GRP2 of first light sources LED1a positioned at the same first edge EDG1 of the substrate SUB1.

The light (B0a) of the light sources of the first group GRP1 may form a first partial guided light beam $B1a_{11}$, when coupled into the substrate SUB1. The spatial intensity distribution of the guided beam $B1a_{11}$ may be non-uniform in the direction SY of the edge EDG1. The guided beam $B1a_{11}$ may be coupled out of the substrate SUB1 by grooves G1, which are within a first partial region REG11 of the substrate SUB1. The dimension $L2_{11}$ of the first partial region REG11 may be substantially smaller than the corresponding dimension $L2_{SUB1}$ of the substrate SUB1. The dimensions $L2_{11}$, $L2_{SUB1}$ may be defined e.g. in the direction SY. The guided beam $B1a_{11}$ may have an angular divergence $\Delta\theta_{11}$. The angular divergence $\Delta\theta_{11}$ of the guided beam $B1a_{11}$ may be e.g. smaller than 30° in order to define a visually detectable boundary BND11 of the region REG11. The angular divergence $\Delta\theta_{11}$ may be e.g. smaller than 10° to provide a substantially sharp boundary BND11.

The light (B0a) of the light sources of the second group GRP2 may form a second partial guided light beam $B1a_{12}$, when coupled into the substrate SUB1. The spatial intensity distribution of the guided beam $B1a_{12}$ may be non-uniform in the direction SY of the edge EDG1. The guided beam $B1a_{12}$ may be coupled out of the substrate SUB1 by grooves G1, which are within a second partial region REG12 of the substrate SUB1. The dimension $L2_{12}$ of the second partial region REG12 may be substantially smaller than the corresponding dimension $L2_{SUB1}$ of the substrate SUB1. The dimensions $L2_{12}$, $L2_{SUB1}$ may be defined e.g. in the direction SY. The dimension $L2_{12}$ of the second partial region REG12 may be e.g. greater than or equal to 50% of the dimension $L2_{SUB1}$ of the substrate SUB1 in the direction (SY) of the edge EDG1.

The device 500 may comprise a first partial region REG11 to project deflected light B2a by coupling light of the first partial guided beam $B1a_{11}$ out of the substrate SUB1, and a second partial region REG12 to project deflected light B2a by coupling light of the second partial guided beam $B1a_{12}$ out of the substrate SUB1, wherein the second partial region REG12 is not arranged to couple light of the first partial guided beam $B1a_{11}$ out of the substrate SUB1.

The regions REG11, REG12 may be partial regions of the out-coupling region REG1 shown in FIG. 12c, for example.

The masking device 500 may have a first additional operation mode where the light sources of the first group GRP1 are switched on, and where the light sources of the second group GRP2 are switched off. The substrate may have a first partial region REG11 where the intensity of the first guided partial beam $B1a_{11}$ is high (higher), and the substrate may have a second partial region REG12 where the intensity of the second guided partial beam $B1a_{12}$ is low (lower) or zero.

The first partial region REG11 may project first deflected light B2a to the second viewing region ZONE2, whereas the second partial region REG12 does not project first deflected light B2a to the second viewing region ZONE2. Partitioning the light sources into two or more groups GRP1, GRP2, and independent controlling of the groups GRP1, GRP2 may provide one or more independently controllable spatial regions REG11, REG12 of the substrate SUB1.

In the first additional operating mode, the projected deflected light B2a may prevent observing first information INFO1 displayed within the first partial region REG11, when viewed from the second viewing region ZONE2. In the first additional operating mode, second information INFO2 displayed within the second partial region REG12 may be observed, when viewed from the second viewing region ZONE2.

The masking device 500 may have a second additional operating mode where the light sources of the first group GRP1 are switched off, and where the light sources of the second group GRP2 are switched on.

In the second additional operating mode, first information INFO1 displayed within the first partial region REG11 may be observed, when viewed from the second viewing region ZONE2. In the second additional operating mode, the projected deflected light B2a may prevent observing second information INFO2 displayed within the second partial region REG12, when viewed from the second viewing region ZONE2.

The operation of the second group GRP2 may be enabled and disabled in a situation where the operation of the first group GRP1 remains enabled. The device 500 may be arranged to switch the first light sources LED1a of the second group GRP2 on and off in a situation where the first light sources LED1a of the first group GRP1 remain switched on.

Figure 13:
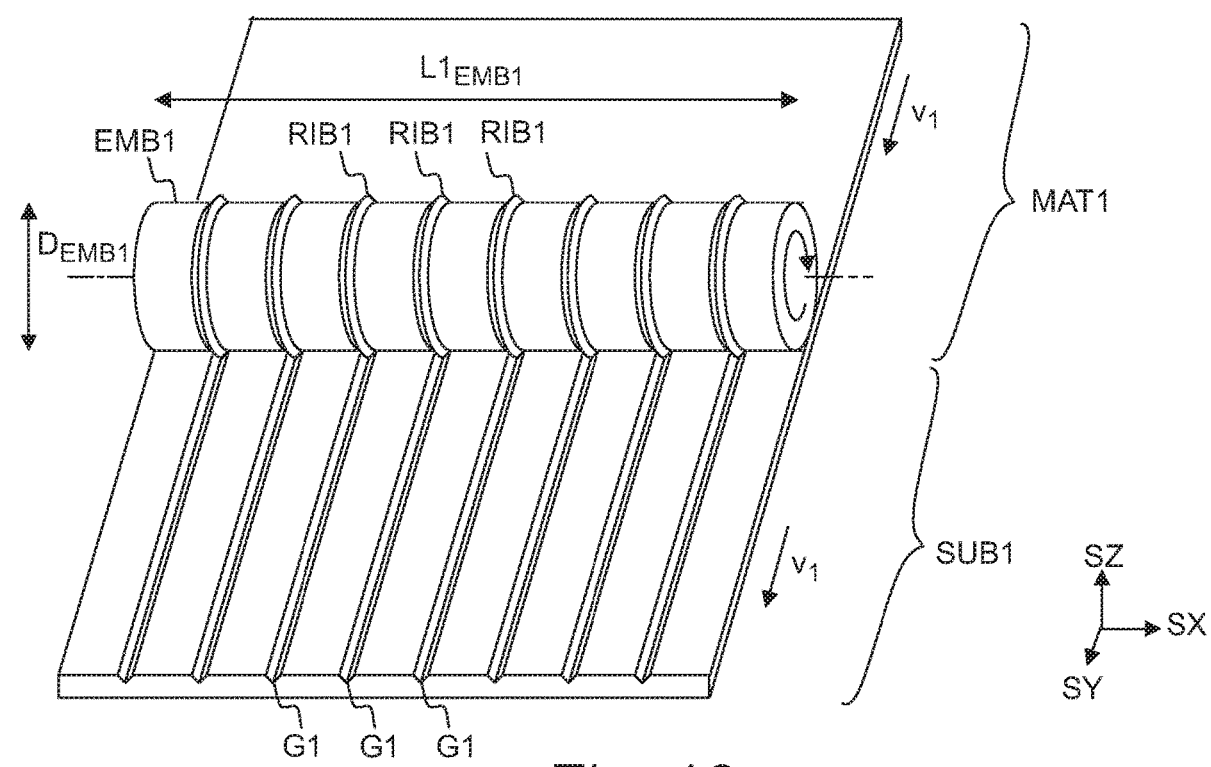
FIG. 13 shows by way of example, in a three-dimensional view, forming the grooves by embossing.

Referring to FIG. 13, the substrate SUB1 may be produced e.g. by embossing on a material MAT1. An embossing tool EMB1 may comprise microscopic protrusions RIB1, which may form the grooves G1 on the substrate SUB1, when pressed against the material MAT1 of the substrate. The grooves G1 may be formed e.g. by using a rotating embossing roll EMB1, which may be pressed against the material MAT1. The material MAT1 and the substrate SUB1 may move at a velocity $v_1$ with respect to the embossing tool EMB1. The rotating embossing tool EMB1 may allow producing the substrate SUB1 with a roll-to-roll process.

Forming the grooves G1 by embossing may facilitate mass production of a large quantity of substrates SUB1. Forming the grooves G1 by embossing may facilitate producing a substrate SUB1 which has a large surface area. Forming the grooves G1 by embossing may facilitate producing a substrate SUB1, which has a large width and/or length ($L1_{SUB1}$, $L2_{SUB1}$).

The grooves G1 may be formed by hot embossing, wherein the embossing tool EMB1 and/or the material MAT1 may be heated above a glass transition temperature of the material MAT1. The shape of the grooves G1 may be subsequently stabilized by cooling the material MAT1.

The shape of the grooves G1 may also be stabilized e.g. by curing UV-curable material MAT1 with ultraviolet radiation. UV means ultraviolet radiation.

The embossing tool EMB1 may be formed e.g. by mechanical machining. In particular, the embossing tool EMB1 may be formed by mechanical machining by using a lathe. The protrusions RIB1 may be formed e.g. by cutting with a diamond edge. Forming the embossing tool EMB1 in the lathe may facilitate producing an embossing roll EMB1, which has a large dimension $D_{EMB1}$ and/or a large dimension $L1_{EMB1}$. The symbol $D_{EMB1}$ may denote the diameter of the embossing roll EMB1. The symbol $L1_{EMB1}$ may denote the length of the embossing roll EMB1.

A groove G1 may have e.g. substantially uniform width $w_{G1}$ and/or substantially uniform depth $h_{G1}$. A groove G1 may have e.g. substantially rectangular shape when viewed in the direction (SZ), which is perpendicular to the first major surface SRF1. The grooves may have the same width or different widths. The grooves may have the same depth or different depths.

Figure 14A:
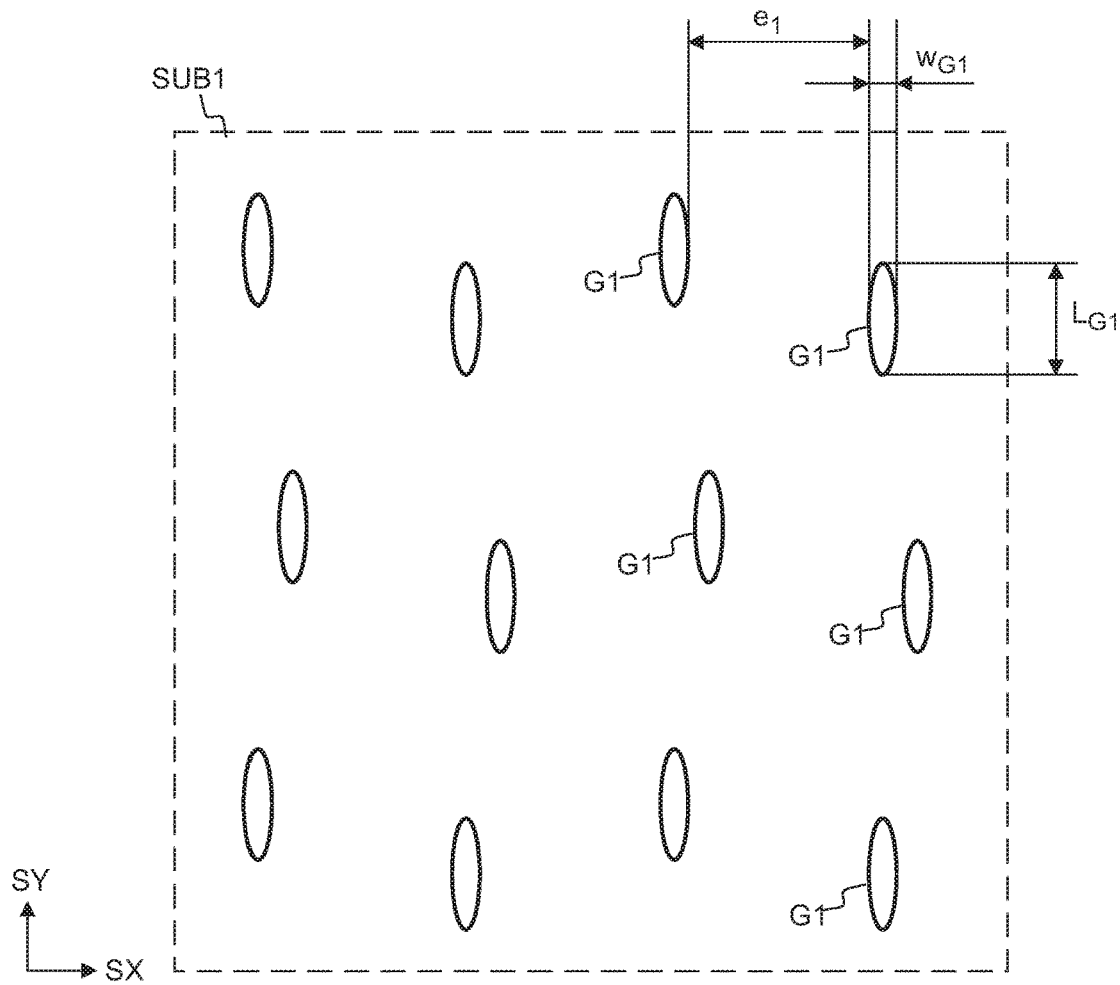
FIG. 14a shows, by way of example, in a front view, a substrate which comprises short grooves.
Figure 14B:
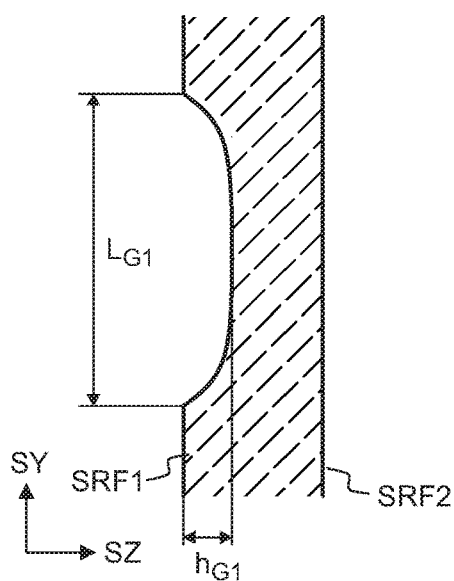
FIG. 14b shows, by way of example, in a cross-sectional view, a groove which has non-uniform depth.

Referring to FIGS. 14a and 14b, the grooves G1 may also have non-uniform width $w_{G1}$ and/or non-uniform depth $h_{G1}$. A groove G1 may have e.g. substantially elliptical shape when viewed in the direction (SZ), which is perpendicular to the first major surface SRF1.

The ratio ($L_{G1}/w_{G1}$) of the length $L_{G1}$ of a groove G1 to the width $w_{G1}$ of the groove G1 may be e.g. greater than 2.0 in order to provide directional light-deflecting properties. The ratio ($L_{G1}/w_{G1}$) may be e.g. greater than 2.0, greater than 5.0, or even greater than 10.0.

Figure 14C:
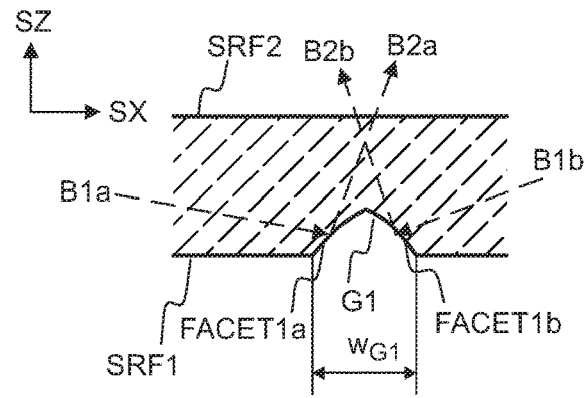
FIG. 14c shows, by way of example, in a cross-sectional view, a groove which has curved light-deflecting facets.

The facets FACET1a, FACET1b of a groove G1 may be flat or curved. FIG. 14c shows, by way of example, a groove G1 which has curved facets.

Various aspects are illustrated by the following examples.

Example 1

A masking device (500), comprising:
one or more first light sources (LED1a) to provide first input light (B0a),
a waveguiding substrate (SUB1), which has a first major surface (SRF1) and a second major surface (SRF2),
wherein an out-coupling region (REG1) of the substrate (SUB1) comprises a plurality of grooves (G1) implemented on the first major surface (SRF1) and/or on the second major surface (SRF2),
wherein the device (500) is arranged to form first guided light (B1a) by coupling the first input light (B0a) into the substrate (SUB1),
wherein the grooves (G1) are arranged to form first deflected light (B2a) by coupling the first guided light (B1a) out of the substrate (SUB1) through the second major surface (SRF2) of the substrate (SUB1),
wherein an area covered by the grooves (G1) within the out-coupling region (REG1) of the substrate (SUB1) is smaller than 5% of the area of the out-coupling region (REG1) such that average optical attenuation ($\Delta I_{V0}/I_{V0}$) in the out-coupling region (REG1) is smaller than 20% for visible light (V0), which is transmitted through the substrate (SUB1) in a direction (SZ), which is perpendicular to the first major surface (SRF1), wherein the average optical attenuation ($\Delta I_{V0}/I_{V0}$) is the average value of optical attenuation over the out-coupling region (REG1).

Example 2

The device (500) of example 1, wherein the average distance ($\theta_1$) between adjacent grooves (G1) is smaller than 0.6 mm within the out-coupling region (REG1).

Example 3

The device (500) of example 1 or 2, wherein the width ($w_{G1}$) of the grooves (G1) is in the range of 0.5 µm to 10 µm, and wherein the depth ($h_{G1}$) of the grooves (G1) is in the range of 0.5 µm to 5 µm.

Example 4

The device (500) according to any of the examples 1 to 3, wherein the width ($w_{G1}$) of the grooves (G1) is smaller than 10 µm.

Example 5

The device (500) according to any of the examples 1 to 4, wherein the width ($w_{G1}$) of the grooves (G1) is smaller than 5 µm.

Example 6

The device (500) according to any of the examples 1 to 5, comprising one or more second light sources (LED1b) to provide second input light (B0b), wherein the device (500) is arranged to form second guided light (B1b) by coupling the second input light (B0b) into the substrate (SUB1), wherein the grooves (G1) are arranged to form second deflected light (B2b) by coupling the second guided light (B1b) out of the substrate (SUB1) through the second major surface (SRF2) of the substrate (SUB1),
wherein the angular intensity distribution ($I_{B2a}(\varphi)$) of the first deflected light (B2a) has a maximum in a first inclined direction (DIR2a),
wherein the angular intensity distribution ($I_{B2b}(\varphi)$) of the second deflected light (B2b) has a maximum in a second inclined direction (DIR2b), and
wherein the first inclined direction (DIR2a) is different from the second inclined direction (DIR2b).

Example 7

The device (500) of example 6, wherein the angle ($\varphi_{DIR2a}$) between the first inclined direction (DIR2a) and the normal direction (SZ) of the substrate (SUB1) is equal to the angle ($\varphi_{DIR2b}$) between the normal direction (SZ) and the second inclined direction (DIR2b), the normal direction (SZ) being perpendicular to the second major surface (SRF2) of the substrate (SUB1).

Example 8

The device (500) of example 6, wherein the angle ($\varphi_{DIR2a}$) between the first inclined direction (DIR2a) and the normal direction (SZ) of the substrate (SUB1) is different from the angle ($\varphi_{DIR2b}$) between the normal direction (SZ) and the second inclined direction (DIR2b), the normal direction (SZ) being perpendicular to the second major surface (SRF2) of the substrate (SUB1).

Example 9

The device (500) according to any of the examples 1 to 8, comprising a communication unit (RXTX1) to receive a control signal ($S_{MODE}$) from a display device (800), wherein the device (500) is arranged to enable and disable operation of the first light sources (LED1a) according to the control signal ($S_{MODE}$).

Example 10

The device (500) according to any of the examples 1 to 9, comprising a first subset (GRP1) of first light sources (LED1a) to form a first partial guided beam ($B1a_{11}$), and a second independently controllable subset (GRP2) of first light sources (LED1a) to form a second partial guided beam ($B1a_{12}$), wherein the first subset (GRP1) is positioned at a first edge (EDG1) of the substrate (SUB1) and the second subset (GRP2) is positioned at the same first edge (EDG1) of the substrate (SUB1).

Example 11

The device (500) of example 10, comprising a first partial region (REG11) of the substrate (SUB1) to project deflected light (B2a) by coupling light of the first partial guided beam (B1$a_{11}$) out of the substrate (SUB1), and a second partial region (REG12) to project deflected light (B2a) by coupling light of the second partial guided beam (B1$a_{12}$) out of the substrate (SUB1), wherein the second partial region (REG12) is not arranged to couple light of the first partial guided beam (B1$a_{11}$) out of the substrate (SUB1).

Example 12

An apparatus (1000), comprising the masking device (500) according to any of the examples 1 to 11, the apparatus (1000) further comprising a display device (800), which comprises a display (DISP1) for displaying graphical information (INFO1) on the display (DISP1), wherein the masking device (500) is disposed over the display (DISP1), wherein the masking device (500) has a first viewing region (ZONE1), a second viewing region (ZONE2), a first operating mode (MODE1), and a second operating mode (MODE2), wherein in the first operating mode (MODE1):
the masking device (500) does not project first deflected light (B2a) to the second viewing region (ZONE2), and
the masking device (500) allows visually observing the displayed graphical information (INFO1) through the waveguiding substrate (SUB1) when viewed from the first viewing region (ZONE1) and when viewed from the second viewing region (ZONE2),
wherein in the second operating mode (MODE2):
the masking device (500) projects first deflected light (B2a) to the second viewing region (ZONE2) so as to prevent visually observing the displayed graphical information (INFO1) through the waveguiding substrate (SUB1) when viewed from the second viewing region (ZONE2), and
the masking device (500) allows visually observing the displayed graphical information (INFO1) through the waveguiding substrate (SUB1) when viewed from the first viewing region (ZONE1).

Example 13

The apparatus (1000) of example 12, having a third viewing region (ZONE3) and a third operating mode (MODE3),
wherein in the third operating mode (MODE3):
the masking device (500) projects second deflected light (B2b) to the third viewing region (ZONE3) so as to prevent visually observing the displayed graphical information (INFO1) through the waveguiding substrate (SUB1) when viewed from the third viewing region (ZONE3), and
the masking device (500) allows visually observing the displayed graphical information (INFO1) through the waveguiding substrate (SUB1) when viewed from the first viewing region (ZONE1) and when viewed from the second viewing region (ZONE2).

Example 14

The apparatus (1000) of example 12 or 13, comprising a user interface (UIF1) for setting the masking device (500) to operate in a selected operating mode (MODE1, MODE2, MODE3, MODE4).

Example 15

A method for controlling visibility of information (INFO1) displayed on a display (DISP1) by using the masking device (500) according to any of the examples 1 to 11, the method comprising:
operating the masking device (500) in a first operating mode (MODE1) wherein the masking device (500) does not project first deflected light (B2a) to a second viewing region (ZONE2), and
operating the masking device (500) in a second operating mode (MODE2) wherein the masking device (500) projects first deflected light (B2a) to the second viewing region (ZONE2).

Example 16

The method of example 15, wherein the maximum intensity ($I_{B2a}$) of the first deflected light (B2a) is higher the maximum intensity ($I_{V0}$) of light (V0) emitted from the display (DISP1).

Example 17

A method for producing the device (500) according to any of the examples 1 to 11, the method comprising producing the grooves (G1) by embossing.

For the person skilled in the art, it will be clear that modifications and variations of the systems, products, devices and methods according to the present disclosure are perceivable. The figures are schematic. The particular embodiments described above with reference to the accompanying drawings are illustrative only and not meant to limit the scope of the disclosed embodiments, which is defined by the appended claims.

The invention claimed is:

1. An apparatus comprising a display for displaying graphical information, and a masking device disposed over the display,
the masking device comprising:
one or more first light sources to provide first input light,
a waveguiding substrate, which has a first major surface and a second major surface,
wherein an out-coupling region of the substrate comprises a plurality of grooves implemented on the first major surface and/or on the second major surface,
wherein the masking device is arranged to form first guided light by coupling the first input light into the substrate,
wherein the grooves are arranged to form first deflected light by coupling the first guided light out of the substrate through the second major surface of the substrate,
wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region,
wherein the masking device has a protected operating mode where the masking device allows visually observing the displayed graphical information through the waveguiding substrate when viewed from a first viewing region, and where the masking device projects the first deflected light to a second viewing region so as to prevent visually observing the displayed graphical information through the waveguiding substrate when viewed from the second viewing region,
wherein the width of the grooves is smaller than 10 μm, wherein the width of the grooves is in the range of 0.5 μm to 10 μm, and wherein the depth of the grooves is in the range of 0.5 μm to 5 μm.

2. The apparatus of claim 1, wherein the average distance between adjacent grooves is smaller than 0.6 mm within the out-coupling region.

3. The apparatus of claim 1, comprising one or more second light sources to provide second input light, wherein the masking device is arranged to form second guided light by coupling the second input light into the substrate, wherein the grooves are arranged to form second deflected light by coupling the second guided light out of the substrate through the second major surface of the substrate,
wherein the angular intensity distribution of the first deflected light has a maximum in a first inclined direction,
wherein the angular intensity distribution of the second deflected light has a maximum in a second inclined direction, and
wherein the first inclined direction is different from the second inclined direction.

4. The apparatus of claim 3, wherein the angle between the first inclined direction and the normal direction of the substrate is equal to the angle between the normal direction and the second inclined direction, the normal direction being perpendicular to the second major surface of the substrate.

5. The apparatus of claim 3, wherein the angle between the first inclined direction and the normal direction of the substrate is different from the angle between the normal direction and the second inclined direction, the normal direction being perpendicular to the second major surface of the substrate.

6. The apparatus of claim 1, wherein the masking device comprises a communication unit to receive a control signal from the display device, wherein the masking device is arranged to enable and disable operation of the first light sources according to the control signal.

7. The apparatus of claim 1, comprising a first subset of first light sources to form a first partial guided beam, and a second independently controllable subset of first light sources to form a second partial guided beam, wherein the first subset is positioned at a first edge of the substrate and the second subset is positioned at the same first edge of the substrate.

8. The apparatus of claim 7, comprising a first partial region of the substrate to project deflected light by coupling light of the first partial guided beam out of the substrate, and a second partial region to project deflected light by coupling light of the second partial guided beam out of the substrate, wherein the second partial region is not arranged to couple light of the first partial guided beam out of the substrate.

9. The apparatus of claim 1, wherein the masking device has a first operating mode, and the second protected operating mode,
wherein in the first operating mode:
the masking device does not project first deflected light to the second viewing region, and
the masking device allows visually observing the displayed graphical information through the waveguiding substrate when viewed from the first viewing region and when viewed from the second viewing region,
wherein in the second protected operating mode:
the masking device projects first deflected light to the second viewing region so as to prevent visually observing the displayed graphical information through the waveguiding substrate when viewed from the second viewing region, and
the masking device allows visually observing the displayed graphical information through the waveguiding substrate when viewed from the first viewing region.

10. The apparatus of claim 9, having a third viewing region and a third operating mode,
wherein in the third operating mode:
the masking device projects the second deflected light to the third viewing region so as to prevent visually observing the displayed graphical information through the waveguiding substrate when viewed from the third viewing region, and
the masking device allows visually observing the displayed graphical information through the waveguiding substrate when viewed from the first viewing region and when viewed from the second viewing region.

11. The apparatus of claim 9, comprising a user interface for setting the masking device to operate in a selected operating mode.

12. A method for controlling visibility of information displayed on a display for displaying graphical information, an apparatus comprising the display and a masking device disposed over the display, the masking device comprising:
one or more first light sources to provide first input light,
a waveguiding substrate, which has a first major surface and a second major surface, wherein an out-coupling region of the substrate comprises a plurality of grooves implemented on the first major surface and/or on the second major surface,
wherein the masking device is arranged to form first guided light by coupling the first input light into the substrate,
wherein the grooves are arranged to form first deflected light by coupling the first guided light out of the substrate through the second major surface of the substrate,
wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region,
wherein the width of the grooves is smaller than 10 μm, wherein the width of the grooves is in the range of 0.5 μm to 10 μm, and wherein the depth of the grooves is in the range of 0.5 μm to 5 μm;
wherein the method comprises:
operating the masking device in a first operating mode, wherein the masking device does not project first deflected light to a second viewing region, wherein the masking device allows visually observing the displayed graphical information through the waveguiding substrate when viewed from a first viewing region and when viewed from a second viewing region, and operating the masking device in a second protected operating mode, wherein the masking device projects the first deflected light to the second viewing region so as to prevent visually observing the displayed graphical information through the waveguiding substrate when viewed from the second viewing region, wherein the masking device allows visually observing the displayed graphical information through the waveguiding substrate when viewed from the first viewing region.

13. The method of claim 12, wherein the maximum intensity of the first deflected light is higher than the maximum intensity of light emitted from the display.

14. A method for producing a masking device of an apparatus, the apparatus comprising a display for displaying graphical information, and the masking device disposed over the display, the masking device comprising:
- one or more first light sources to provide first input light,
- a waveguiding substrate, which has a first major surface and a second major surface,
- wherein an out-coupling region of the substrate comprises a plurality of grooves implemented on the first major surface and/or on the second major surface,
- wherein the masking device is arranged to form first guided light by coupling the first input light into the substrate,
- wherein the grooves are arranged to form first deflected light by coupling the first guided light out of the substrate through the second major surface of the substrate,
- wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region,
- wherein the masking device has an operating mode where the masking device allows visually observing the displayed graphical information through the waveguiding substrate when viewed from a first viewing region, and where the masking device projects the first deflected light to a second viewing region so as to prevent visually observing the displayed graphical information through the waveguiding substrate when viewed from the second viewing region, wherein the width of the grooves is smaller than 10 μm,
wherein the width of the grooves is in the range of 0.5 μm to 10 μm, and wherein the depth of the grooves is in the range of 0.5 μm to 5 μm,
wherein the method comprises producing the grooves by embossing.

* * * * *